(12) United States Patent  
Cox

(10) Patent No.: US 9,209,840 B2  
(45) Date of Patent: Dec. 8, 2015

(54) SAME-APERTURE ANY-FREQUENCY SIMULTANEOUS TRANSMIT AND RECEIVE COMMUNICATION SYSTEM

(71) Applicant: Photonic Systems, Inc., Billerica, MA (US)

(72) Inventor: Charles H. Cox, Carlisle, MA (US)

(73) Assignee: Photonic Systems, Inc., Billerica, MA (US)

( * ) Notice: Subject to any disclaimer, the term of this patent is extended or adjusted under 35 U.S.C. 154(b) by 0 days.

(21) Appl. No.: 14/455,233

(22) Filed: Aug. 8, 2014

(65) Prior Publication Data

US 2014/0349595 A1 Nov. 27, 2014

Related U.S. Application Data

(63) Continuation-in-part of application No. 13/844,180, filed on Mar. 15, 2013.

(60) Provisional application No. 61/864,538, filed on Aug. 10, 2013, provisional application No. 61/755,044, filed on Jan. 22, 2013, provisional application No. 61/677,366, filed on Jul. 30, 2012.

(51) Int. Cl.  
*H04B 1/04* (2006.01)  
*H04B 1/525* (2015.01)

(52) U.S. Cl.  
CPC ............. *H04B 1/0458* (2013.01); *H04B 1/525* (2013.01)

(58) Field of Classification Search  
CPC ........ H04B 1/0458; H04B 1/44; H04B 1/525; G01S 13/32; G01S 7/352  
See application file for complete search history.

(56) References Cited

U.S. PATENT DOCUMENTS

| | | |
|---|---|---|
| 2,973,512 A | 2/1961 | Walsh |
| 4,719,412 A | 1/1988 | d'Humieres et al. |

(Continued)

FOREIGN PATENT DOCUMENTS

| | | |
|---|---|---|
| AU | 2008227105 | 4/2013 |
| EP | 0282293 A2 | 9/1988 |

(Continued)

OTHER PUBLICATIONS

Duarte, Experiment-Driven Characterization of Full Duplex Wireless Systems, Aug. 4, 2011, 68 pages, Rice University.

(Continued)

*Primary Examiner* — Sujatha Sharma  
(74) *Attorney, Agent, or Firm* — Kurt Rauschenbach; Rauschenbach Patent Law Group, LLC

(57) ABSTRACT

A simultaneous transmit and receive (STAR) system includes a first bidirectional signal port coupled to an antenna, a second port coupled to a transmit signal path, and a third port coupled to receive signal path. A first switch is electrically connected between the first port and the second port, where a transmit signal propagating in the transmit signal path passes through the first switch when closed and then through the first bidirectional signal port to the antenna where the transmit signal is radiated by the antenna. A second switch is connected between the first port and the third port, where a receive signal is received by the antenna and passes through the bidirectional signal port and then through the second switch when closed to the receive signal path. A controller is electrically connected to a control input of each of the first and second switches.

29 Claims, 33 Drawing Sheets

(56) References Cited

U.S. PATENT DOCUMENTS

| | | |
|---|---|---|
| 5,074,631 A | 12/1991 | Hamano et al. |
| 5,287,212 A | 2/1994 | Cox et al. |
| 5,303,079 A | 4/1994 | Gnauk et al. |
| 5,369,381 A | 11/1994 | Gamand |
| 5,389,782 A | 2/1995 | Hilliard |
| 5,602,387 A | 2/1997 | Bowen |
| 5,977,911 A | 11/1999 | Green et al. |
| 6,028,695 A | 2/2000 | Uemura et al. |
| 6,081,232 A | 6/2000 | Pittman et al. |
| 6,137,442 A | 10/2000 | Roman et al. |
| 6,175,672 B1 | 1/2001 | Newberg et al. |
| 6,295,395 B1 | 9/2001 | Paek |
| 6,310,706 B1 | 10/2001 | Heidemann et al. |
| 6,320,539 B1 | 11/2001 | Matthews et al. |
| 6,330,098 B1 | 12/2001 | Gopalakrishnan |
| 6,337,660 B1 | 1/2002 | Esman et al. |
| 6,393,177 B2 | 5/2002 | Paek |
| 6,704,349 B1 | 3/2004 | Masenten |
| 7,369,290 B1 | 5/2008 | Cox et al. |
| 7,555,219 B2 | 6/2009 | Cox et al. |
| 7,561,803 B2 | 7/2009 | Burns et al. |
| 7,760,343 B2 | 7/2010 | Roussell et al. |
| 7,809,216 B2 | 10/2010 | Cox |
| 7,826,751 B2 | 11/2010 | Cox et al. |
| 7,970,241 B2 | 6/2011 | Chen et al. |
| 8,249,536 B2 | 8/2012 | Jung et al. |
| 8,400,234 B2 | 3/2013 | Yang et al. |
| 8,433,163 B2 | 4/2013 | Cox et al. |
| 8,462,836 B2 | 6/2013 | Choi |
| 8,463,201 B2 | 6/2013 | Jung et al. |
| 8,537,881 B2 | 9/2013 | Choi et al. |
| 8,674,870 B2 | 3/2014 | Maunder et al. |
| 8,755,750 B2 | 6/2014 | Cox et al. |
| 8,868,006 B2 | 10/2014 | Cox et al. |
| 2002/0012500 A1 | 1/2002 | Paek |
| 2002/0106141 A1 | 8/2002 | Gopalakrishnan |
| 2003/0090769 A1 | 5/2003 | Lagasse |
| 2003/0147581 A1 | 8/2003 | Doi et al. |
| 2004/0114542 A1 | 6/2004 | Stopler |
| 2005/0069327 A1 | 3/2005 | Franck et al. |
| 2006/0273952 A1* | 12/2006 | Krikorian et al. ............. 342/198 |
| 2007/0189778 A1 | 8/2007 | Burns et al. |
| 2007/0194886 A1 | 8/2007 | Bang et al. |
| 2007/0206961 A1 | 9/2007 | Iannelli |
| 2008/0175593 A1 | 7/2008 | Li |
| 2009/0060412 A1 | 3/2009 | Chen et al. |
| 2009/0130981 A1 | 5/2009 | Nagai et al. |
| 2009/0296790 A1 | 12/2009 | Cheung et al. |
| 2010/0029350 A1 | 2/2010 | Zhang |
| 2010/0105425 A1* | 4/2010 | Asokan ...................... 455/552.1 |
| 2011/0051833 A1* | 3/2011 | Midya et al. .................. 375/267 |
| 2011/0263214 A1* | 10/2011 | Robinson et al. ............... 455/88 |
| 2013/0102254 A1* | 4/2013 | Cyzs et al. ................... 455/63.1 |
| 2014/0128008 A1 | 5/2014 | Cox et al. |
| 2014/0141712 A1 | 5/2014 | Maunder et al. |
| 2014/0242935 A1 | 8/2014 | Cox et al. |
| 2015/0085709 A1* | 3/2015 | Lee et al. ...................... 370/278 |

FOREIGN PATENT DOCUMENTS

| | | |
|---|---|---|
| EP | 1649539 | 1/2011 |
| FR | 2796766 A1 | 1/2001 |
| JP | 57197934 | 12/1982 |
| JP | 09008737 | 1/1997 |
| JP | 4478680 | 3/2010 |
| JP | 5328680 | 8/2013 |
| KR | 10-0966222 | 6/2010 |
| KR | 10-1222726 | 1/2013 |
| WO | 2005008832 A2 | 1/2005 |

OTHER PUBLICATIONS

Choi, et al., Achieving Single Channel, Full Duplex Wireless Communication, 12 pages, Stanford University.

Wegener, et al., Simultaneous Transmit and Receive With a Small Planar Array, 3 pages, Purdue University.

Day, et al., Full-Duplex Bidirectional MIMO: Achievable Rates Under Limited Dyanmic Range IEEE, Jul. 2012.

"Notification Concerning Transmittal of International Preliminary Report on Patentability (Chapter I of the Patent Cooperation Treaty)", for PCT/US2011/037136, Dec. 6, 2012, 7 pages, International Bureau of WIPO, Geneva, Switzerland.

"Notification of Transmittal of the International Search Report and the Written Opinion of the International Searching Authority, or the Declaration" for PCT/US2011/37136, Oct. 25, 2011, 11 pages, International Searching Authority, Korean Intellectual Property Office, Seo-gu, Daejeon, Republic of Korea.

"Notification Concerning Transmittal of International Preliminary Report on Patentability (Chapter I of the Patent Cooperation Treaty)", for PCT/US2009/041058, Nov. 4, 2010, 6 pages, The International Bureau of WIPO, Geneva, Switzerland.

Ackerman, et al., The Effect of a Mach-Zehnder Modulator's Travelling Wave Electrode Loss on a Photonic Link's Noise Figure, Photonic Systems, Inc., Burlington, MA, US.

Anderson, Is a Broadband Low Noise Photonic Link an Oxymoron?, Lockheed Martin Advanced Technology Center, Palo Alto, CA, US.

Wenzel, Low Frequency Circulator/lsolator Uses No Ferrite or Magnet, RF Design Awards.

"Notification of Transmittal of the International Search Report and the Written Opinion of the International Searching Authority, or the Declaration" for PCT/US08/003297, Jul. 4, 2008, 11 pages, The International Searching Authority/EPO, Rijswijk, The Netherlands.

"Notification Concerning Transmittal of International Preliminary Report on Patentability (Chapter I of the Patent Cooperation Treaty)", for PCT/US2008/003297, Oct. 1, 2009, 8 pages, The International Bureau of WIPO, Geneva, Switzerland.

Notification of Transmittal of the International Search Report and the Written Opinion of the International Searching Authority, or the Declaration for PCT/US2009/041058, Nov. 30, 2009, 11 pages, International Searching Authority, Korean Intellectual Property Office, Seo-gu, Daejeon, Republic of Korea.

Notification of Transmittal of the International Search Report and the Written Opinion of the International Searching Authority, or the Declaration for PCT/US2014/050343, Oct. 30, 2014, 9 pages, International Searching Authority, Korean Intellectual Property Office, Seo-gu, Daejeon, Republic of Korea.

Cox, et al., Demostration of a Single-Aperture, Full-Duplex Communication System, IEEE, Jan. 2013.

Cox, et al., Photonics for Simultaneous Transmit and Receive, IEEE MTT-S International Microwave Symposium Digest, Jun. 20, 2011.

"Notification Concerning Transmittal of International Preliminary Report on Patentability (Chapter I of the Patent Cooperation Treaty)", for PCT/US2013/052649, Feb. 12, 2015, 6 pages, The International Bureau of WIPO, Geneva, Switzerland.

"Office Action" for U.S. Appl. No. 13/844,180, Mar. 13, 2015, 25 pages, The USPTO, Alexandria, VA, US.

Ghose, Rabindra, N., Interference Mitigation, 1996, pp. 39-45, IEEE Electromagnetic Compatibility Society, IEEE Press, Institute of Electrical and Electronics Engineers, New York.

* cited by examiner

High impedance at output of transmit path

Fast switch

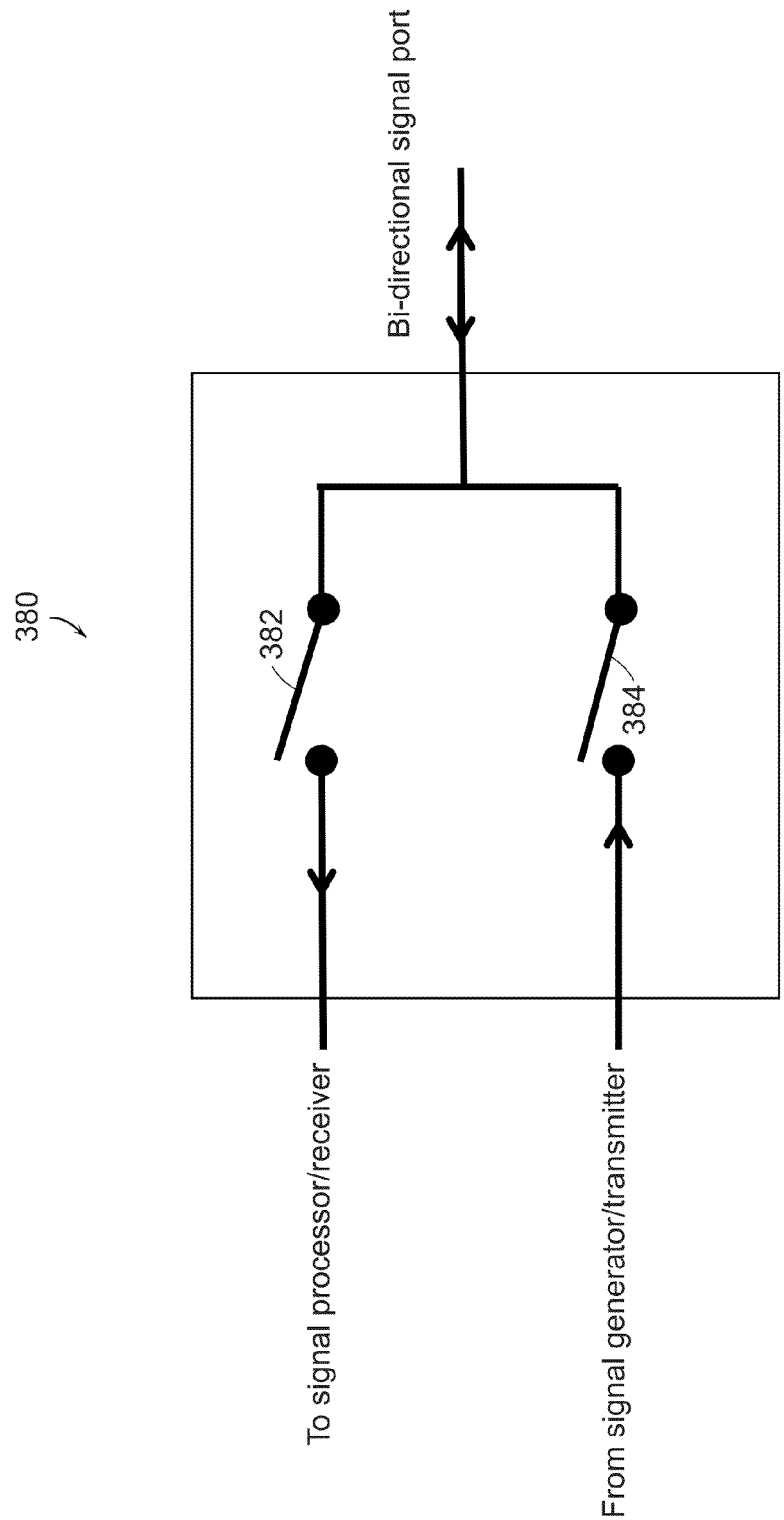

Non-reciprocal electronic

Photonic

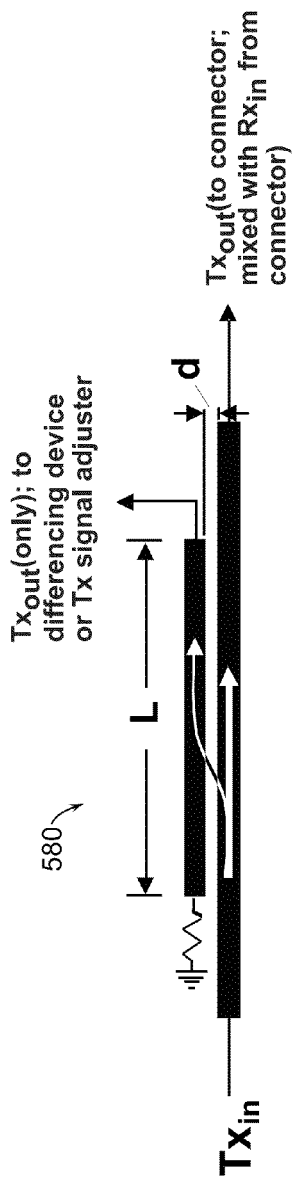
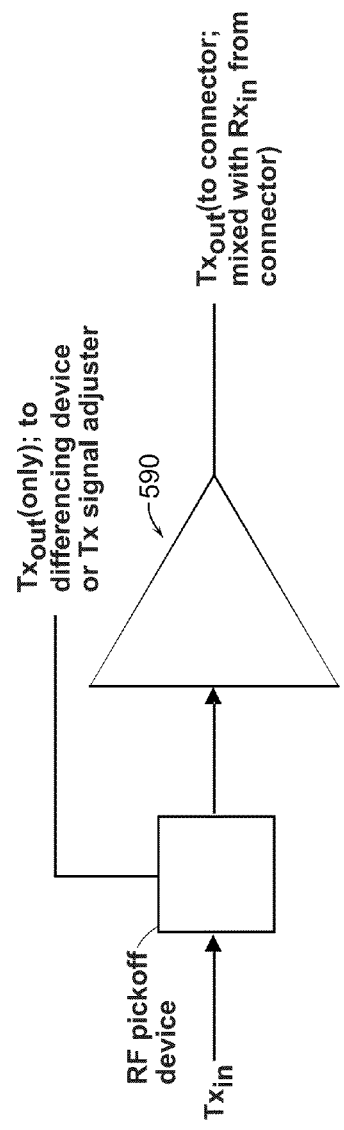
FIG. 5E
FIG. 5F

Digital w/o frequency conversion (e.g. at RF)

Digital w frequency conversion (e.g. at IF or baseband)

SAME-APERTURE ANY-FREQUENCY SIMULTANEOUS TRANSMIT AND RECEIVE COMMUNICATION SYSTEM

CROSS REFERENCE TO RELATED APPLICATION SECTION

The present application is a non-provisional application of U.S. Provisional Patent Application No. 61/864,538, filed on Aug. 10, 2013, entitled "Effective Bi-Directional Signal Interface." In addition, the present application is a continuation-in-part of U.S. patent application Ser. No. 13/844,180 filed on Mar. 15, 2013, entitled "Same-Aperture Any-Frequency Simultaneous Transmit and Receive Communication System," which claims priority to U.S. Provisional Patent Application No. 61/755,044, filed on Jan. 22, 2013, entitled "Single-Aperture, Full Duplex Communication System," and claims priority to U.S. Provisional Patent Application No. 61/677,366 filed on Jul. 30, 2012, entitled "Signal Canceller and Simultaneous Transmit and Receive System with Signal Processing." The entire contents U.S. patent application Ser. No. 13/844,180, and U.S. Provisional Patent Applications Nos. 61/864,538, 61/755,044 and 61/677,366 are herein incorporated by reference.

The section headings used herein are for organizational purposes only and should not to be construed as limiting the subject matter described in the present application in any way.

INTRODUCTION

It is generally assumed in communications that it is not possible to simultaneously transmit and receive (STAR) in the same frequency band. Recently this basic tenet has begun to be challenged by several groups that have reported prototype STAR systems. Researchers at Purdue in, for example, A. Wegener and W. Chappell, "Simultaneous transmit and receive with a small planar array," IEEE MTT-S Int. Microwave Symp. Dig., Montreal, June 2012, and researchers at Stanford in, for example, J. Choi, et al., "Achieving Single Channel, Full Duplex Wireless Communication," Proc. Int. Conf. Mobile Computing and Networking, New York, 2010 have proposed arrangements of multiple antenna elements in which the receive antenna is located in a null of the transmit antenna pattern to realize ~40 dB of transmit-to-receive (T/R) isolation.

Signal processing was then used to extend the T/R isolation to ~60-70 dB. A group at Rice University using single, separate transmit and receive antennas, computed the required cancelling signal and used it to cancel the transmit signal before it reached the analog-to-digital converter. See A. Sahai, B. Patel and A. Sabharwal, "Asynchronous full-duplex wireless," Proc. Int. Conf. on Communication Systems and Networks, pp. 1-9, 2012. This group reported up to 79 dB suppression. A key limitation of these approaches is the limited bandwidth over which sufficient T/R isolation can be achieved.

BRIEF DESCRIPTION OF THE DRAWINGS

The present teaching, in accordance with preferred and exemplary embodiments, together with further advantages thereof, is more particularly described in the following detailed description, taken in conjunction with the accompanying drawings. The skilled person in the art will understand that the drawings, described below, are for illustration purposes only. The drawings are not necessarily to scale, emphasis instead generally being placed upon illustrating principles of the teaching. The drawings are not intended to limit the scope of the Applicant's teaching in any way.

FIG. 3E illustrates a signal connector for a bi-directional connection to both incoming and outgoing signal ports.

FIG. 5E illustrates a directional coupler isolator that can be used with the same-aperture any-frequency STAR system according to the present teaching.

FIG. 5F illustrates an active electronic isolator that can be used with the same-aperture any-frequency STAR system according to the present teaching.

DESCRIPTION OF VARIOUS EMBODIMENTS

Figure 1:
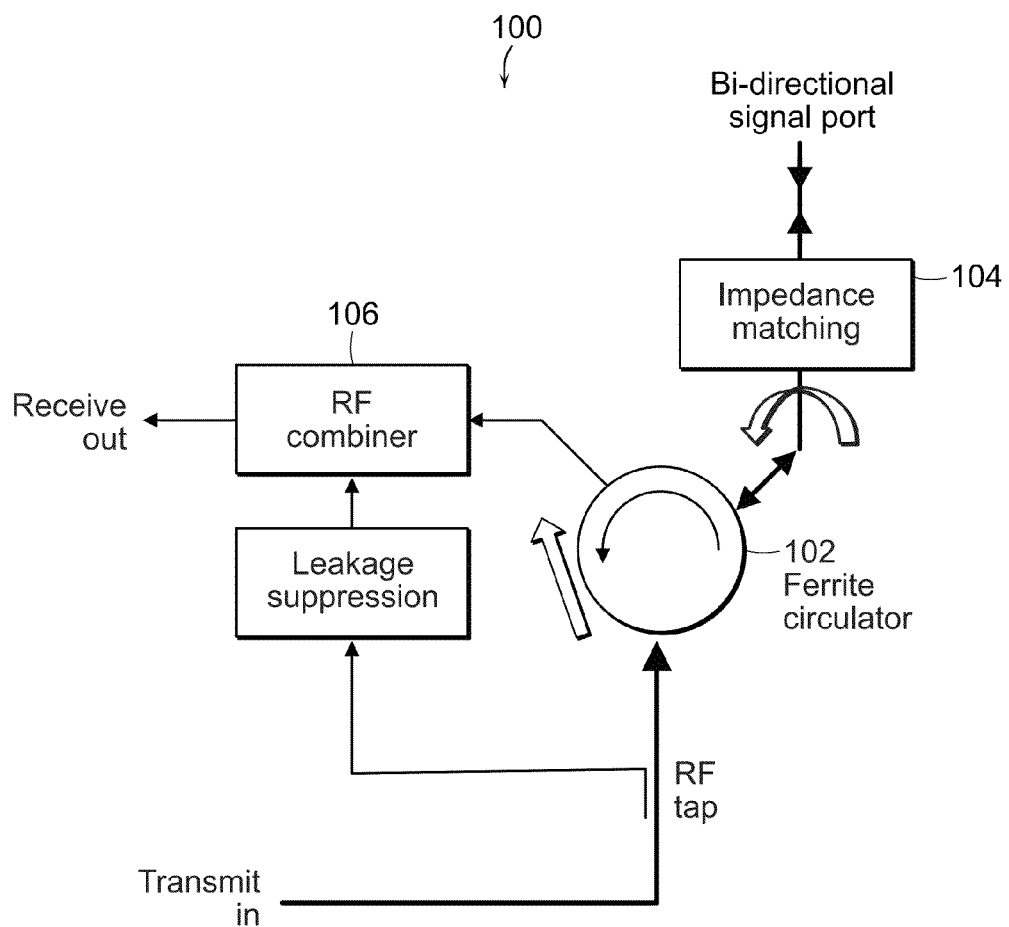
FIG. 1 illustrates a block diagram of a same-aperture any-frequency simultaneously transmit and receive (STAR) system using known technology.

Reference in the specification to "one embodiment" or "an embodiment" means that a particular feature, structure, or characteristic described in connection with the embodiment is included in at least one embodiment of the teaching. The appearances of the phrase "in one embodiment" in various places in the specification are not necessarily all referring to the same embodiment.

It should be understood that the individual steps of the methods of the present teachings may be performed in any order and/or simultaneously as long as the teaching remains operable. Furthermore, it should be understood that the apparatus and methods of the present teachings can include any number or all of the described embodiments as long as the teaching remains operable.

The present teaching will now be described in more detail with reference to exemplary embodiments thereof as shown in the accompanying drawings. While the present teachings are described in conjunction with various embodiments and examples, it is not intended that the present teachings be limited to such embodiments. On the contrary, the present teachings encompass various alternatives, modifications and equivalents, as will be appreciated by those of skill in the art. Those of ordinary skill in the art having access to the teaching herein will recognize additional implementations, modifications, and embodiments, as well as other fields of use, which are within the scope of the present disclosure as described herein.

For decades, there existed only microwave circulators to simultaneously connect the transmit and receive paths to a common antenna. Microwave circulators are passive components with three ports arranged in a waveguide ring around a ferrite disk that induces a direction-dependent phase shift, causing the two counter-circulating halves of the wave to add up constructively at the next port in one circumferential direction along the ring but destructively at the next port in the other direction. A ferrite circulator is an inherently narrow-band device because it depends on summing and differencing the RF phase of two waves. Designers have found ways to widen a ferrite circulator's bandwidth in exchange for some loss of its perfect unidirectionality at its center design frequency. Ferrite circulators are now commercially available from multiple vendors with ~20 dB of port 1-3 isolation over an octave-wide band.

To enable single-aperture STAR applications, separate groups of researchers recently hit upon two active circulator designs. An electronic circulator has achieved up to 40 dB T/R isolation, albeit over only about 10% bandwidth at X-band. A description of the electronic circulator's principle of operation is described in S. Cheung, et al., "MMIC-based quadrature hybrid quasi-circulators for simultaneous transmit and receive," IEEE Trans. Microwave Theory Tech., vol. 58, pp. 489-497, March 2010.

The second new type of device is based on photonics and hence it is referred to herein as a photonic circulator. As described herein, this new photonic component performs two additional functions beyond those of a conventional ferrite circulator. For this reason, we refer to the new photonic component as a TIPRx, for Transmit-Isolating Photonic Receiver.

Several years ago Photonic Systems, Inc., the assignee of the present application, began to investigate a more challenging yet potentially more widely applicable STAR configuration, which is STAR via the same antenna element and in the same polarization.

It is well known in the communications art that to simultaneously transmit and receive via the same aperture, one must use either time, frequency, or code multiplexing. Time multiplexing involves inserting a switch so that either the transmitter or the receiver is connected to the antenna. Frequency multiplexing involves inserting a diplexer and/or filters so that the transmit and the receive signals occupy disjoint portions of the RF spectrum. Code multiplexing uses orthogonal codes for the transmit and receive signals; the relatively limited degree of orthogonality that can be realized, however, often requires code multiplexing to be augmented with frequency multiplexing to achieve sufficient transmit-to-receive (T/R) isolation. Thus, persons skilled in the art generally agree that it is not possible to simultaneously transmit and receive via the same aperture using the same portion of the RF spectrum at the same time.

FIG. 1 illustrates a block diagram of a same-aperture any-frequency simultaneously transmit and receive (STAR) system 100 using known technology. The isolation is provided by the ferrite circulator 102. An impedance matching network 104 is connected to one port of the circulator 102 that receives the reception signal. The transmit signal is applied to the second port of the circulator 102. A 2-way RF combiner 106 is used to combine the receive signal that includes a portion of the transmit signal with a leakage suppression signal.

A key parameter to achieving same-aperture, any-frequency STAR is the T/R isolation; systems typically would require >60 dB of T/R isolation. The system 100 of FIG. 1 shows the two main paths by which the strong transmit signal can enter the receive path. One path is leakage through the circulator 102. Typical T/R isolation of a ferrite circulator is in the range 15-20 dB. It is well known that one can improve the isolation of a circulator by constructing a second path and designing this second path so that the transmit signal in this path destructively interferes with the circulator leakage. However, the bandwidth over which this isolation improvement can be achieved is severely limited. The other primary path by which the transmit signal can enter the receive path is through reflection off the impedance connected to the bi-directional signal port. A typical return loss is also in the range of −15 to −20 dB. One approach to improve the antenna return loss is to use an impedance matching circuit. It can be shown, however, that the required degree of improvement in impedance match is beyond that which is physically realizable, which is set by the Bode-Fano limit. One aspect of the present teaching relates to methods and apparatus for improving the T/R isolation in same-aperture, any-frequency STAR systems over a sufficiently wide bandwidth for practical systems.

Figure 2:
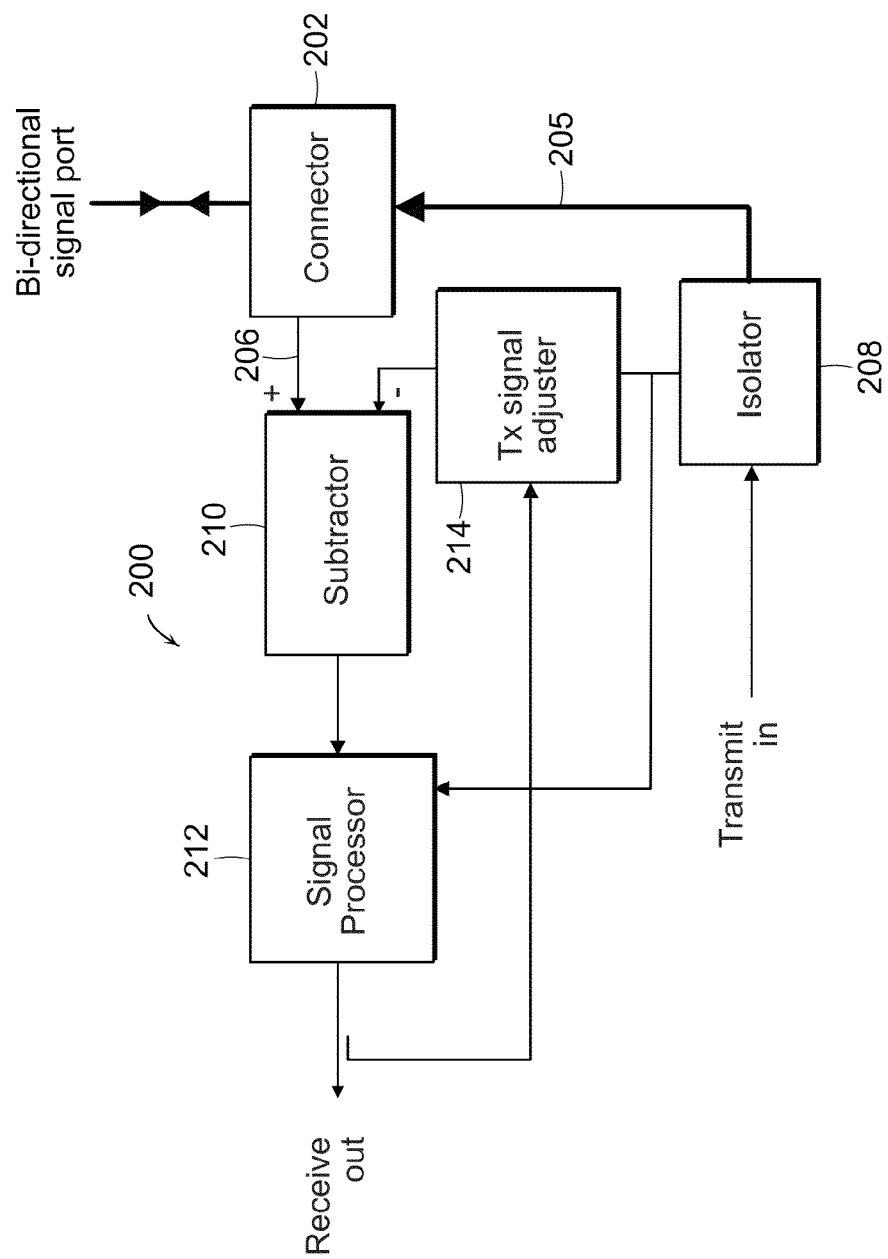
FIG. 2 shows a block diagram of a same-aperture any-frequency STAR system according to the present teaching.

FIG. 2 shows a block diagram of a same-aperture any-frequency STAR system 200 according to the present teaching. The system 200 includes a three-port signal connector 202 that passes both transmit and receive signals. The signal connector 202 connects three signal paths, a bidirectional signal path from and to an interface device, such as an antenna, one from the output of transmit path 205, and one to the input to receive path 206. In practical systems, the relative impedance seen by signals propagating in these paths is important. A signal isolator 208 is present in the transmit signal path 205. A signal differencing device or, equivalently, a signal subtractor 210 connects the signal isolator 208 and the signal connector 202. The system also includes various optional feedback components to improve the T/R isolation.

One input of the differencing device 210 is connected to the receive path 206. Another input of the differencing device 210 is connected to the transmit signal path 205 that ideally has no residual receive signal. The isolator 208 connected to the transmit signal path 205 is designed to isolate any residual receive signal so that a clean copy of the transmit signal is applied to the differencing device 210. In operation, the differencing device 210 subtracts out the large transmit signal, leaving just the receive signal.

If the transmit signal environment is sufficiently stable, it is possible to provide a transmit signal of fixed complex value to the second port of the differencing device 210. However, in many practical same-aperture any-frequency STAR systems, the transmit environment around the antenna will change as a function of time, which in turn will cause the complex value of the transmit signal reflected by the antenna to change. In these situations, it is desirable to include a signal processor 212 to determine the precise complex value of the transmit signal that should be fed to the second terminal of the differencing device 210 so as to minimize the residual transmit signal that is present in the receive path. A transmit signal adjustment circuit 214 is used to set the complex value of the transmit signal.

Figure 3A:
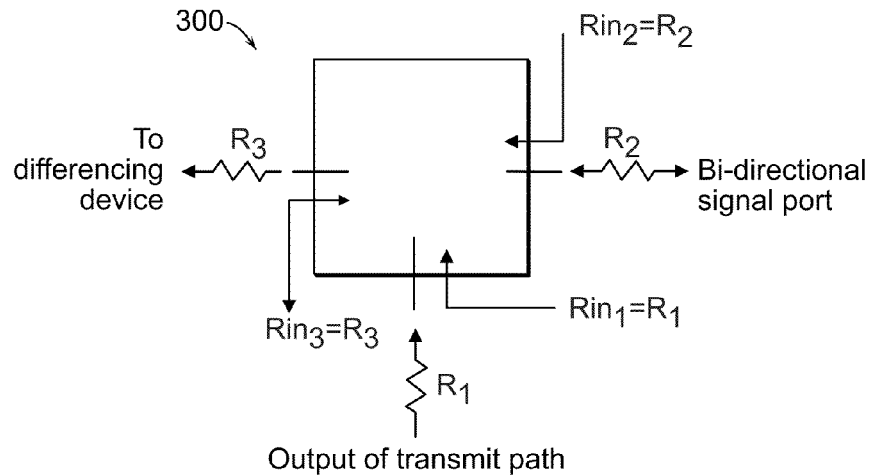
FIG. 3A illustrates a signal connector in which the RF impedance is matched at each of the three ports.

FIGS. 3A-3E illustrate five different signal connectors that can be used with same-aperture any-frequency STAR systems, according to the present teaching. Referring to FIG. 2 and FIGS. 3A-3E, the impedance at each port of the signal connector can be designed to match the impedance of the component that is connected to that port. An impedance match at each port can be achieved in numerous ways known in the art. For example, numerous types of passive impedance matching circuits, including resistors, capacitors, inductors, and transformers, can be used. Also, numerous types of active impedance matching circuits, including transistors and amplifiers, can be used. FIG. 3A illustrates a signal connection 300 where all three ports of the signal connector 300 are impedance-matched to the paths to which they are connected. In some embodiments the bidirectional signal path illustrated in FIGS. 3A-3E are connected to an antenna, which provides the impedance load to the bidirectional signal port. In other embodiments, the device or devices connected to the bidirectional signal port establish a load impedance.

Figure 3B:
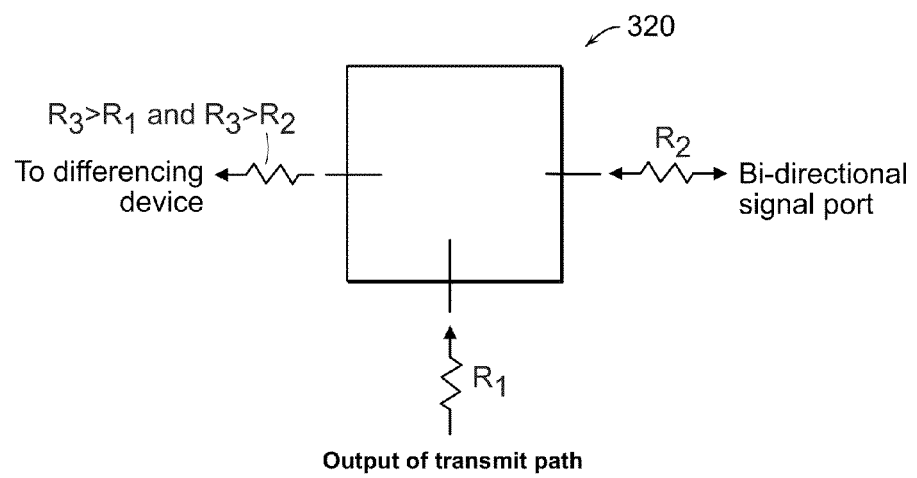
FIG. 3B illustrates a signal connector wherein the path to the differencing device presents a high RF impedance at the port labeled Port 3, which minimizes the signal loss in the connector between Port 1 and Port 2.

FIG. 3B illustrates a signal connector 320 that is presented with a high RF impedance at the input to the differencing device 210, and therefore $R_{diff} > R_{antenna}$ and $R_{diff} > R_{isolator}$. Hence, the antenna impedance provides the primary load to the output of the transmit signal path 205, which means more of the transmit power is delivered to the antenna than is delivered to the receive path 206, which is highly desirable for many applications.

Figure 3C:
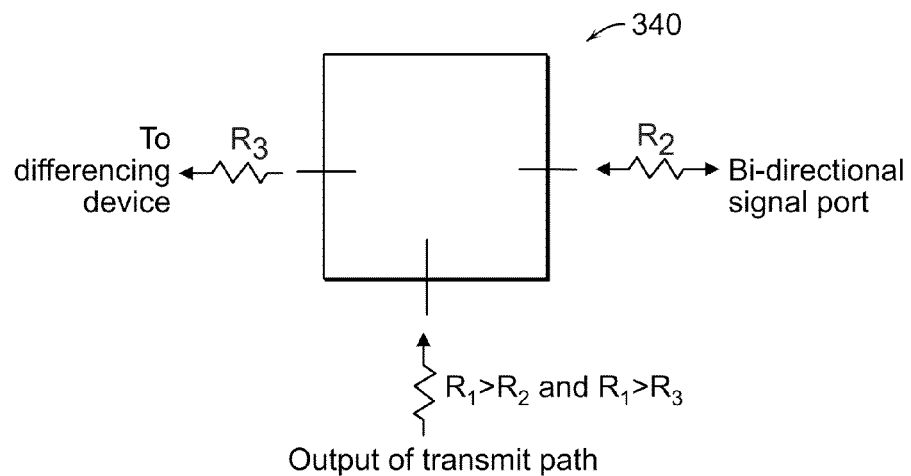
FIG. 3C illustrates a signal connector wherein the output of the transmit signal path presents a high RF impedance at the port labeled Port 1, which minimizes the signal loss in the connector between Port 2 and Port 3.

FIG. 3C illustrates a signal connector 340 that is presented with a high RF impedance at the output of the transmit signal path 205, so that $R_{isolator} > R_{diff}$ and $R_{isolator} > R_{antenna}$. In this signal connector 340, the transmit power is divided between the antenna and the input to the differencing device 210 in proportion to the relative impedances of these two devices, represented by $R_{antenna}$ and $R_{diff}$ respectively. In the special sub-case where $R_{antenna} = R_{diff}$ the maximum receive power will be delivered to the input of the differencing device 210, which is often desired to achieve the maximum receiver sensitivity.

Figure 3D:
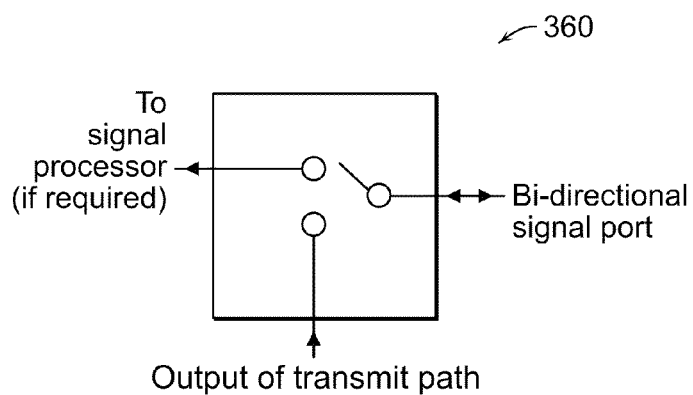
FIG. 3D illustrates a signal connector including a fast switch.

FIG. 3D illustrates a signal connector 360 including a fast switch. The signal connector 360 shown in FIG. 3D supports sampling one or both of the input received signal and the output transmit signal. Sampling using the fast switch, 360, constrains the sampling of the outgoing signal to be the complement of the sampling of the incoming signal. Using the fast switch can eliminate several of the system components. In some embodiments, the fast switch signal connector 360 eliminates the need for the differencing device 210 and isolator 208. The use of the fast switch can also eliminate the need for the signal processor 212 and transmit signal adjustment circuit 214.

FIG. 3E illustrates a signal connector 380 including two fast switches 382, 384. The signal connector 380 shown in FIG. 3E supports sampling one or both of the input received signal and the output transmit signal. The fast switch configuration, 380, permits greater sampling flexibility by enabling the sampling times and the inter-sampling intervals for the incoming and outgoing signals to be selected independently. In some embodiments, the two fast switches 382, 384 are controlled, either simultaneously or independently, to provide various sampling configurations for either or both of the incoming and the outgoing signals. The signal connector 380 illustrated in FIG. 3E supports sampling the receive signal by closing the second switch 382 that connects the bidirectional signal port and the receive signal port for a sampling time. Simultaneously, the first switch 384 that connects the bidirectional signal port and the transmit signal path is opened for the sampling time. During the non-sampling interval, the second switch 382 is open and the switch 384 is closed.

The signal connector 380 illustrated in FIG. 3E also supports sampling the transmit signal by having a controller that closes the first switch 384 at a sampling time for a duration of a sampling interval, while the second switch 382 is opened at a sampling time for a duration of a sampling interval. Numerous other switch state configurations are also possible, wherein the controller switches the state of the first switch 384 and the state of the second switch 382 independently, rather than simultaneously.

The transmit and/or receive signals may be sampled with various sampling times and sampling intervals, including frequent or infrequent sampling, and long or short duration sampling intervals. In embodiments where the transmit signal is much larger than the receive signal, it is desirable that the sampling of the receive signal is performed when the transmit signal is not connected (when the lower switch is open) to ensure near-zero crosstalk from the transmitter to the receiver.

In some embodiments of the present teaching, the bi-directional interface is coupled directly to an antenna. However, it should be understood that the present teaching is not limited to applications where an antenna is coupled to the bi-directional port. For example, in many embodiments of the present teaching, the bi-directional port can be coupled to various wired connections, such as an Ethernet connection or numerous other signal interfaces. Thus, the signal connector of the present teaching can be generally applied in various embodiments to connect one or more outgoing signals, or transmitters to a load impedance at the bi-directional port, while simultaneously receiving one or more incoming signals, or received signals.

There are numerous other applications that advantageously use a simultaneous transmit and receive configuration where various embodiments of the signal connector connect signals of varying power levels. For example, some of the embodiments include interfacing high power transmit signals and low power receive signals, high power receive signals with low power transmit signals, high power transmit and receive signals and low power transmit and receive signals. One skilled in the art will appreciate that the present teaches are not restricted to transmit and receive signals. Various pre-processing or post processing functions may be implemented at the various ports in various embodiments. Such functions may include, for example, amplification, signal clean-up, differencing, and many other signal processing functions known in the art.

Figure 4A:
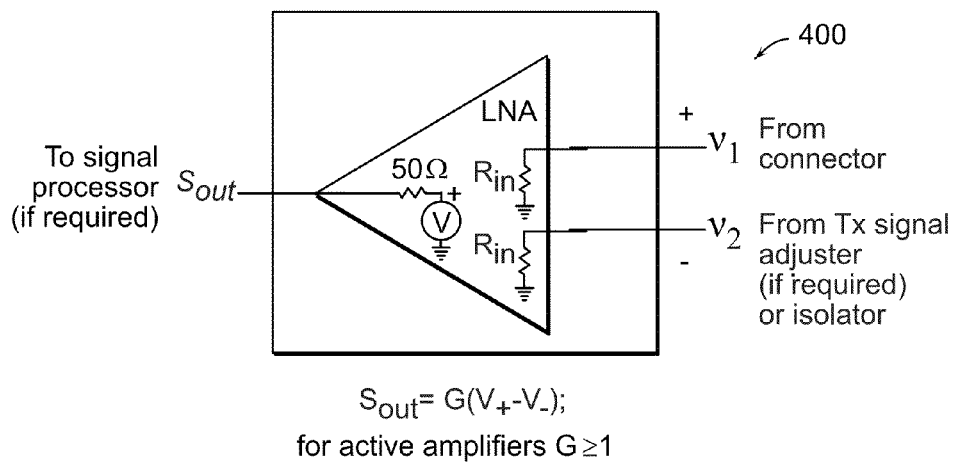
FIGS. 4A and 4B illustrate an active electronic differencing device that takes the difference of two voltages and two currents.
Figure 4B:
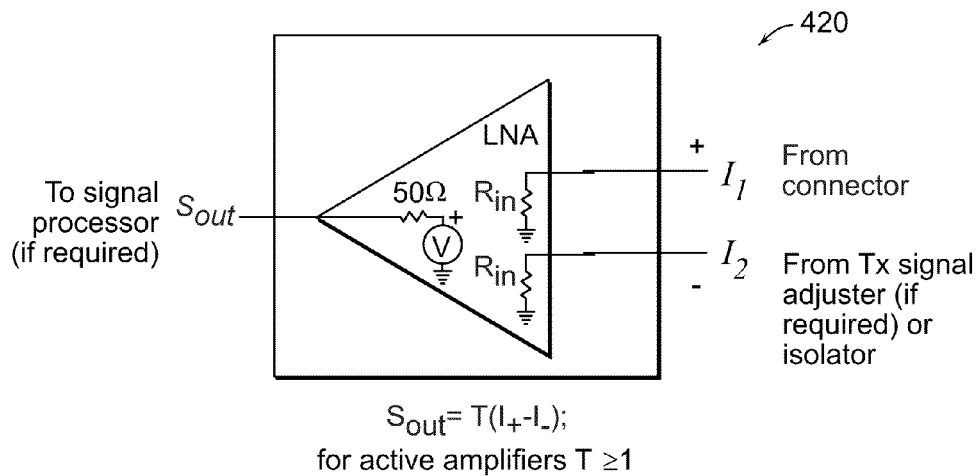

FIGS. 4A-4D illustrate four different differencing devices 210 (FIG. 2). FIG. 4A illustrates an active electronic differencing device 400 that takes the difference of two voltages. FIG. 4B illustrates an active electronic differencing device 420 that takes the difference of two currents. These active differencing devices 400, 420 can be embodied in differential or balanced amplifiers. The active differencing devices 400, 420 typically provide gain, which is well known to be advantageous if it is desired to achieve a low noise figure for the receive signal. The active differencing devices 400, 420 can be realized with a wide range of input impedances. For example, voltage differencing devices typically present a high impedance whereas current differencing devices typically present a low impedance. This range of input impedances for the active differencing devices 400, 420 permits the active differencing device 400, 420 to be used with the matched impedance connection 300 as described in connection with FIG. 3A, the high impedance receive path signal connector 320 described in connection with FIG. 3B, or the high impedance transmit signal connector 340 described in connection with FIG. 3C.

Figure 4C:
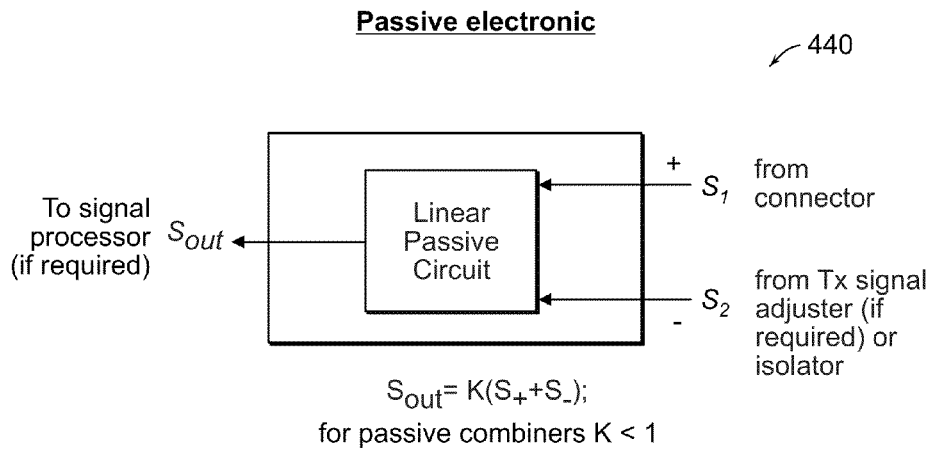
FIG. 4C illustrates a passive electronic differencing device.

FIG. 4C illustrates a passive electronic differencing device 440. Passive devices are limited to having a gain less than one, and thus all have some loss. Consequently, passive differencing devices 440 have higher noise figures than the active electronic differencing devices 400, 420 described in connection with FIGS. 4A and 4B. There are many ways to implement a passive electronic differencing device. For example, lumped element resistive dividers, traveling wave resistive (Wilkinson) dividers, and 180 degree hybrid couplers are all effective at implementing an electronic differencing device.

Active electronic differencing devices, such as the devices 400, 420 described in connection with FIGS. 4A and 4B, can be used to sum two signals. Differencing can be realized by offsetting the phase of the clean transmit signal by 180 degrees relative to the phase of the transmit signal that is applied to the antenna, which effectively applies the inverse of the transmit signal to the summing port. This equivalence between subtracting and adding the inverse is easily demonstrated by the equality: Rx−Tx=Rx+(−Tx). In some embodiments of the present teaching, the same physical hardware can realize both the matched signal connector described in connection with FIG. 3A 300 and the passive differencing device 440 which implements 180 degree phase reversal of the clean transmit signal where necessary as described in connection with FIG. 4C.

Figure 4D:
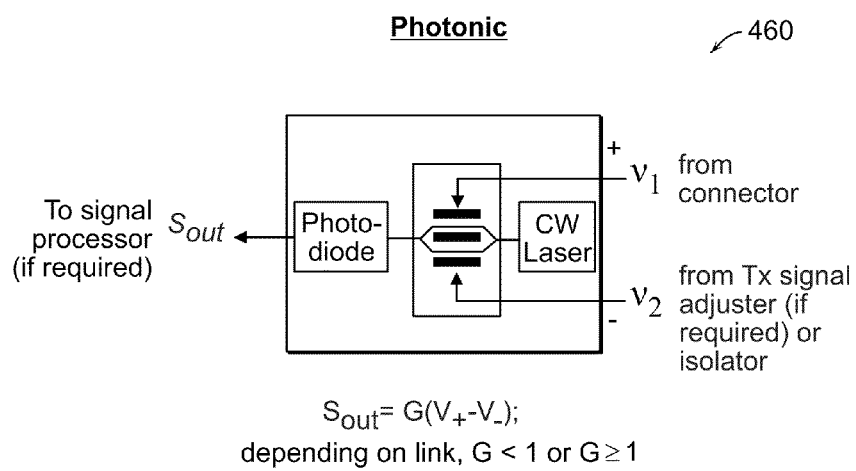
FIG. 4D illustrates one embodiment of a photonic differencing device that includes a balanced-drive optical modulator which produces a modulated output that is proportional to the sum or difference between the signals that are applied to the electrodes.

FIG. 4D illustrates one embodiment of a photonic differencing device 460 that includes a balanced-drive optical modulator which produces a modulated output that is proportional to the sum or difference between the signals that are applied to the electrodes. Such electrodes can be either high impedance or matched impedance so that the photonic differencing device can be used with the matched impedance signal connector 300 described in connection with FIG. 3A, the high impedance receive path signal connector 320 described in connection with FIG. 3B or the high impedance transmit signal connector 340 described in connection with FIG. 3C.

Furthermore, depending on the design of the particular photonic differencing device the photonic differencing device can have a gain that is greater or less than unity. Thus, the photonic differencing device can provide either gain or loss. When the photonic differencing device is designed to have gain, it is capable of achieving low noise figure, much like active electronic differencing devices. When the photonic differencing device is designed to have loss, it has higher noise figure, much like passive electronic differencing devices. Some types of differential optical modulators are only capable of summing two signals. In such cases, these differential modulators can realize the required differencing by offsetting the clean transmit signal by 180 degrees as described in connection with FIG. 4C.

There are two basic types of signal sources: voltage sources and current sources. An ideal voltage source is a signal source with zero internal impedance. An ideal current source is a signal source with infinite internal impedance. Such ideal signal sources are not realizable. Realizable voltage sources generally have an internal impedance that is much lower than the external impedances in the circuit. Realizable current sources generally have an internal impedance that is much larger than the external impedances in the circuit.

FIG. 5 illustrates various signal isolators that can be used with the same-aperture any-frequency STAR system of the present teaching. FIG. 5A illustrates an electronic voltage-source-based isolator 500. The isolator 500 in FIG. 5A shows one simple way that isolation can be achieved with a voltage source. A voltage source establishes a potential difference or voltage across its output terminals. The voltage across a voltage source is independent of an external signal that is applied to its output. Hence the current that is developed through a resistor connected in series with a voltage source will not change the output voltage of the voltage source. For same-aperture any-frequency STAR systems, the voltage source signal is the transmit signal and the externally applied signal would be the receive signal. Consequently, the output of the voltage source will contain a clean copy of the transmit signal, which is what is desired.

Figure 5A:
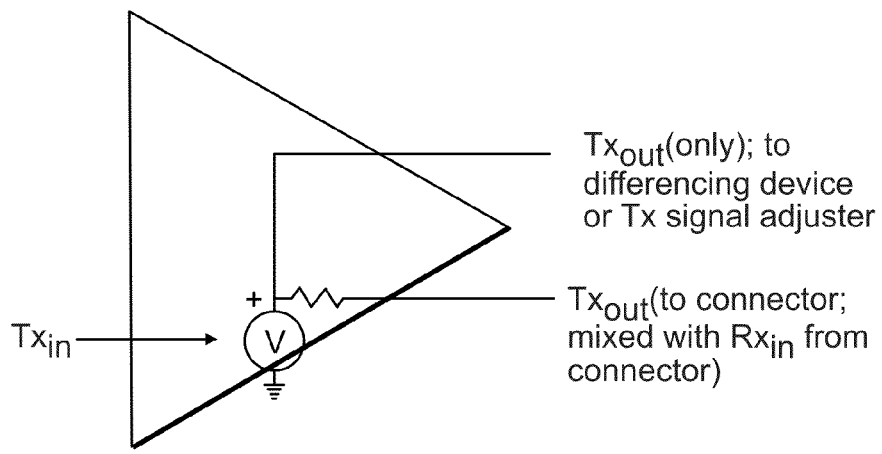
FIG. 5A illustrates an electronic voltage-source-based isolator that can be used with the same-aperture any-frequency STAR system of the present teaching.
Figure 5B:
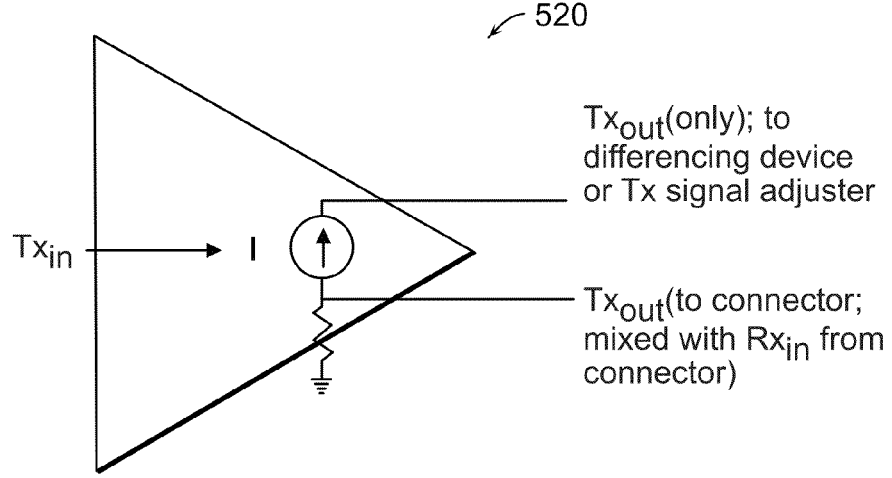
FIG. 5B illustrates a current-source-based signal isolator used with the same-aperture any-frequency STAR system of the present teaching.

FIG. 5B illustrates a current-source-based signal isolator 520 that can be used with the same-aperture any-frequency STAR system of the present teaching. Current sources establish a current that is independent of an external signal applied to its output. Hence, the voltage that develops across a resistor that is connected in series with a current source will only contain the current source signal and will not contain any signal that corresponds to the externally applied signal. For same-aperture any-frequency STAR systems, the current source signal is the transmit signal and the externally applied signal is the receive signal. Consequently, the voltage across the resistor will contain a clean copy of the transmit signal, which is what is desired.

FIG. 5B illustrates a current-source-based signal isolator 520 that can be used with the same-aperture any-frequency STAR system of the present teaching. Current sources establish a current that is independent of an external signal applied to its output. Hence, the current through a current source contains only the current source signal and will not contain any signal that corresponds to the externally applied signal. For same-aperture any-frequency STAR systems, the current source signal is the transmit signal and the externally applied signal is the receive signal. Consequently, the output of the current source will contain a clean copy of the transmit signal, which is what is desired.

Figure 5C:
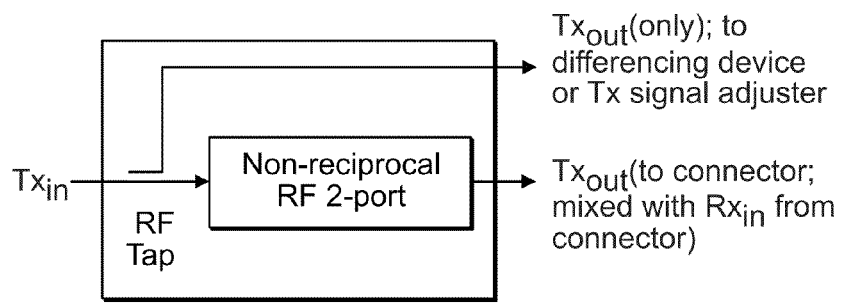
FIG. 5C illustrates a passive electronic isolator including a non-reciprocal RF two-port device that can be used with the same-aperture and frequency STAR system of the present teaching.

FIG. 5C illustrates a non-reciprocal RF isolator 540 that can be used with the apparatus of the present teaching. Examples of non-reciprocal RF isolators are ferrite isolators and gyrators. These devices have low transmission loss in one direction and high transmission loss in the other direction. For example, there can be low transmission loss from port 1 to port 2, but high transmission loss in the other direction, from port 2 to port 1.

Figure 5D:
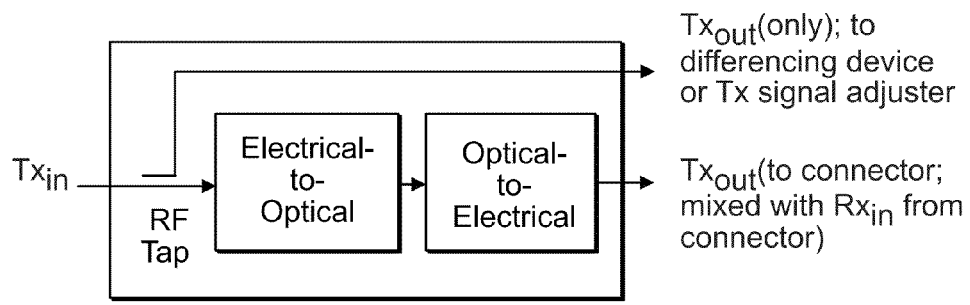
FIG. 5D illustrates a photonic isolator that can be used with the same-aperture any-frequency STAR system according to the present teaching.
Figure 6A:
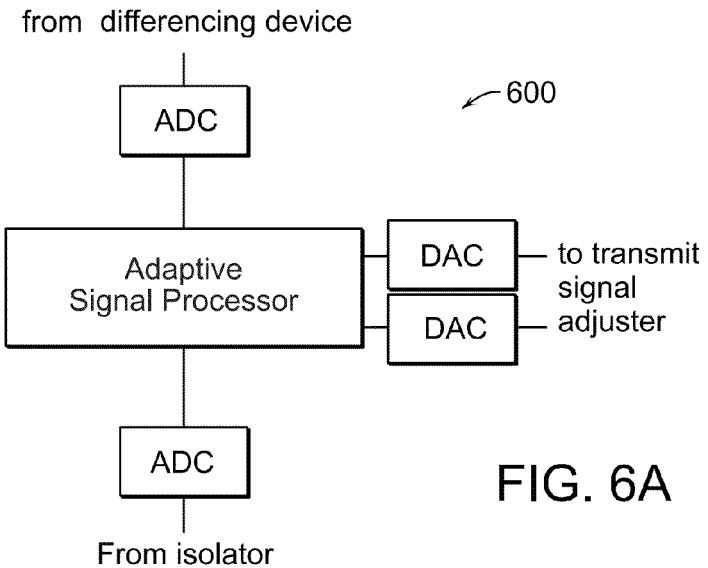
FIGS. 6A-6D illustrate signal processors that can be used with the same-aperture any-frequency STAR system according to the present teaching.
Figure 6B:
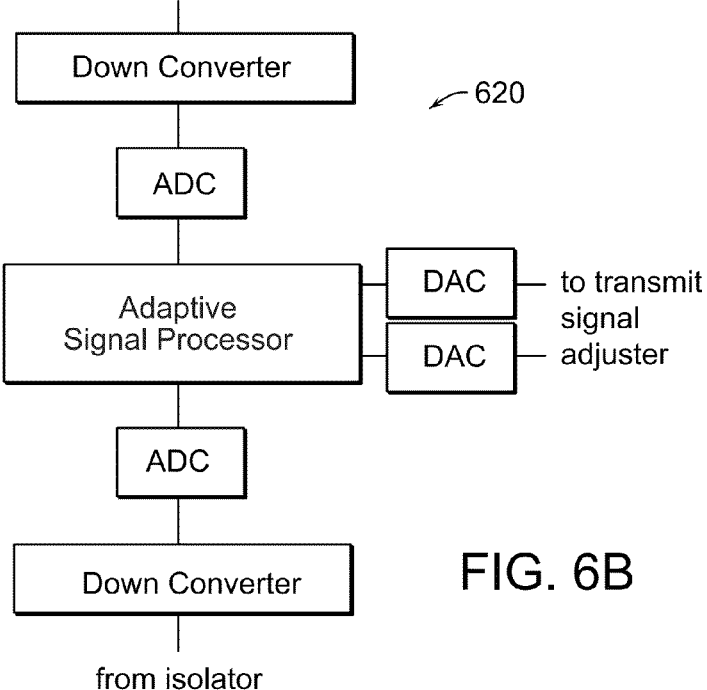
Figure 6C:
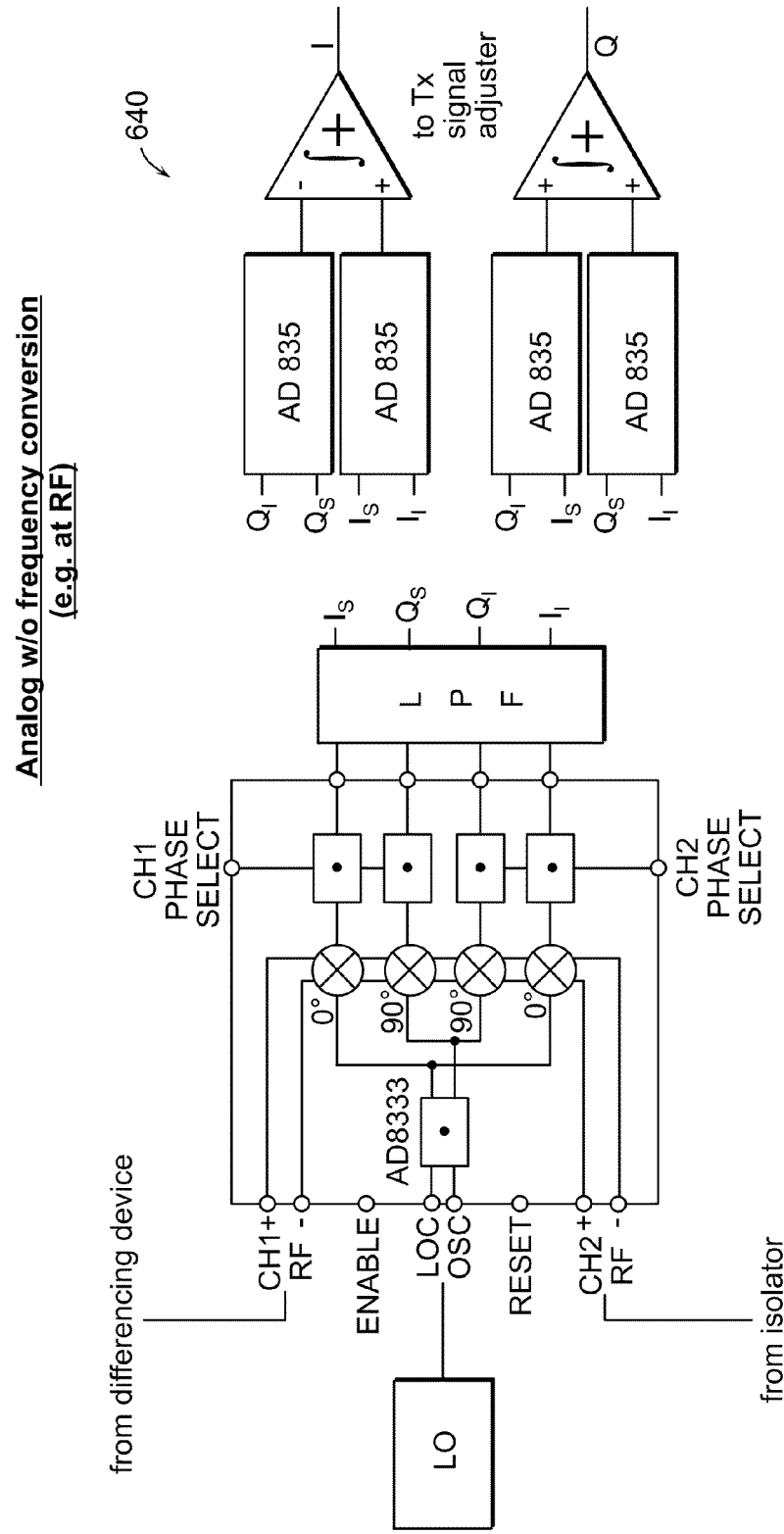
Figure 6D:
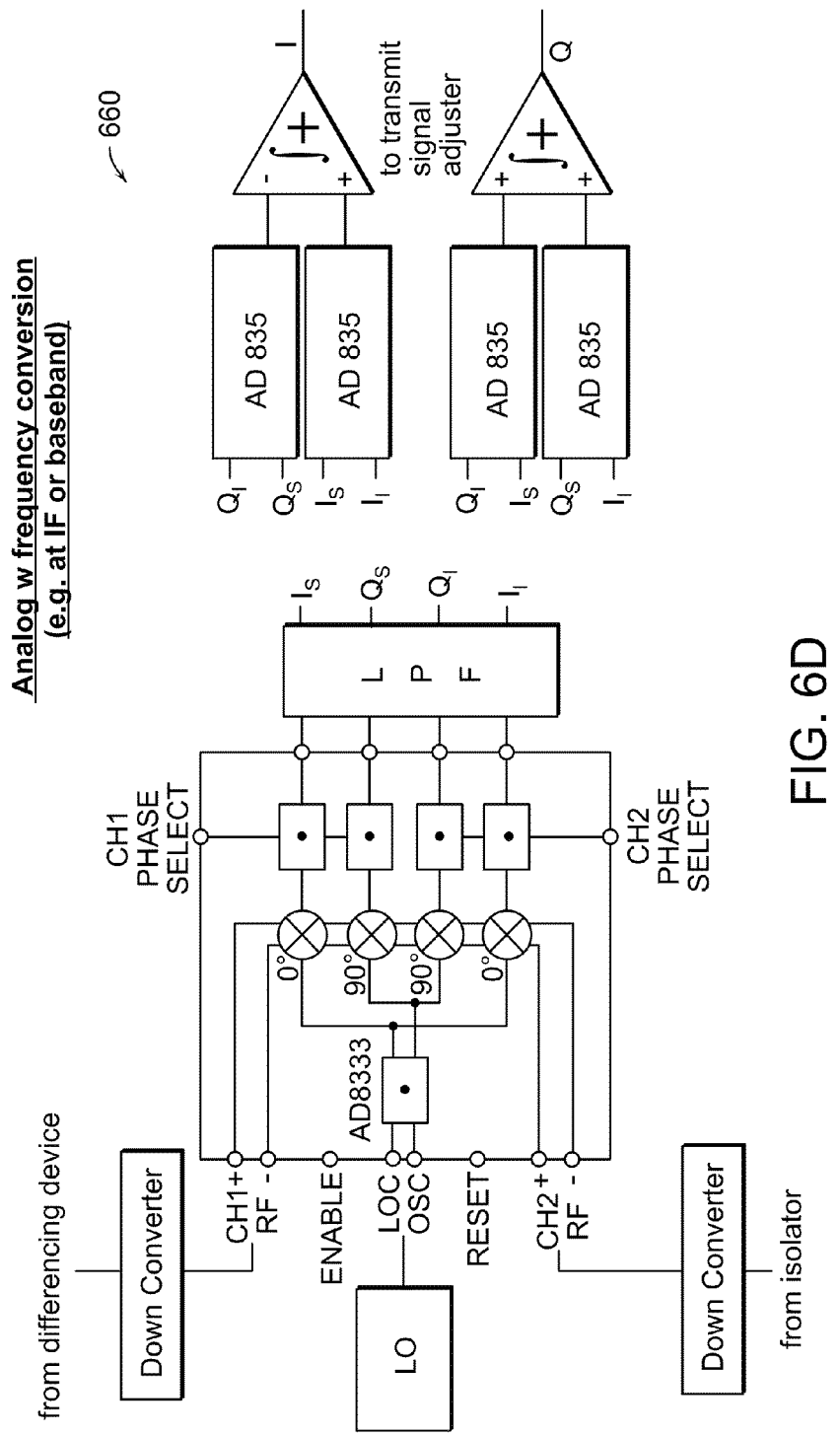

FIG. 5D illustrates a photonic isolator 560 that can be used with the same-aperture any-frequency STAR system according to the present teaching. Photonic isolators provide good coupling in the forward coupling direction and high isolation in the reverse direction. Good coupling in the forward direction is accomplished by an electrical-to-optical conversion device, such as a diode laser or an optical modulator, whose optical output is efficiently coupled to an optical-to-electrical conversion device, such as a photodetector. Photonic isolators provide extremely low coupling in the reverse direction because devices such as photodetector do not emit light, and the electrical-to-optical conversion device is not capable of detecting light.

Numerous other types of isolators can be used in the apparatus of the present teaching. For example, in one embodiment, a directional coupler 580 is used to perform the isolation as shown in FIG. 5E. One common embodiment of a directional coupler uses the traveling wave property. By having a 2nd electrode of the proper length, L, and locating it a proper distance, d, away from a first electrode, a portion of the power traveling in the first electrode will couple over into the 2nd 20 electrode. Since this is a reciprocal device, RF power traveling in the opposite direction in the first electrode will also be coupled into the 2nd electrode and this power is dissipated into a load as shown. Lumped circuit equivalents of the traveling wave directional coupler are well known in the art and hence also can be used to implement the isolation function.

RF isolation can also be achieved in RF amplifiers in which the reverse isolation is greater than the forward gain. An isolation technique that takes advantage of such an amplifier 590 is shown in FIG. 5F. At the input to the amplifier some form of RF pickoff device is needed, such as an RF splitter or a directional coupler.

FIGS. 6A-6D illustrate signal processors 600, 620, 640, and 660 that can be used with the same-aperture any-frequency STAR system according to the present teaching. Various types of digital and/or analog signal processors 600, 620, 640, and 660 can be used as shown in FIGS. 6A-6D. Referring to FIGS. 2 and 6, the signal processors 600, 620, 640, and 660 execute a wide range of algorithms, such as a least mean square algorithm, to perform various functions. The signal processing can be performed at the radio-frequency (RF) of the transmit and the receive signals, or at some lower intermediate-frequency (IF) signals, using well known techniques for converting the RF signals to IF signals. One such function is to correlate the clean copy of the transmit signal with the output of the differencing device 210, which contains both receive and transmit signals. The result of this correlation will be a residual transmit signal that is present in the output of the differencing device 210.

Another function performed by the signal processor 212 is estimating the complex value of the transmit signal that needs to be applied to the input of the differencing device 210 so as to result in minimizing the residual transmit signal at the output of the differencing device 210. The result of this estimation is a signal that is applied to the transmit signal adjustment circuit 214.

Figures 7A, 7B:
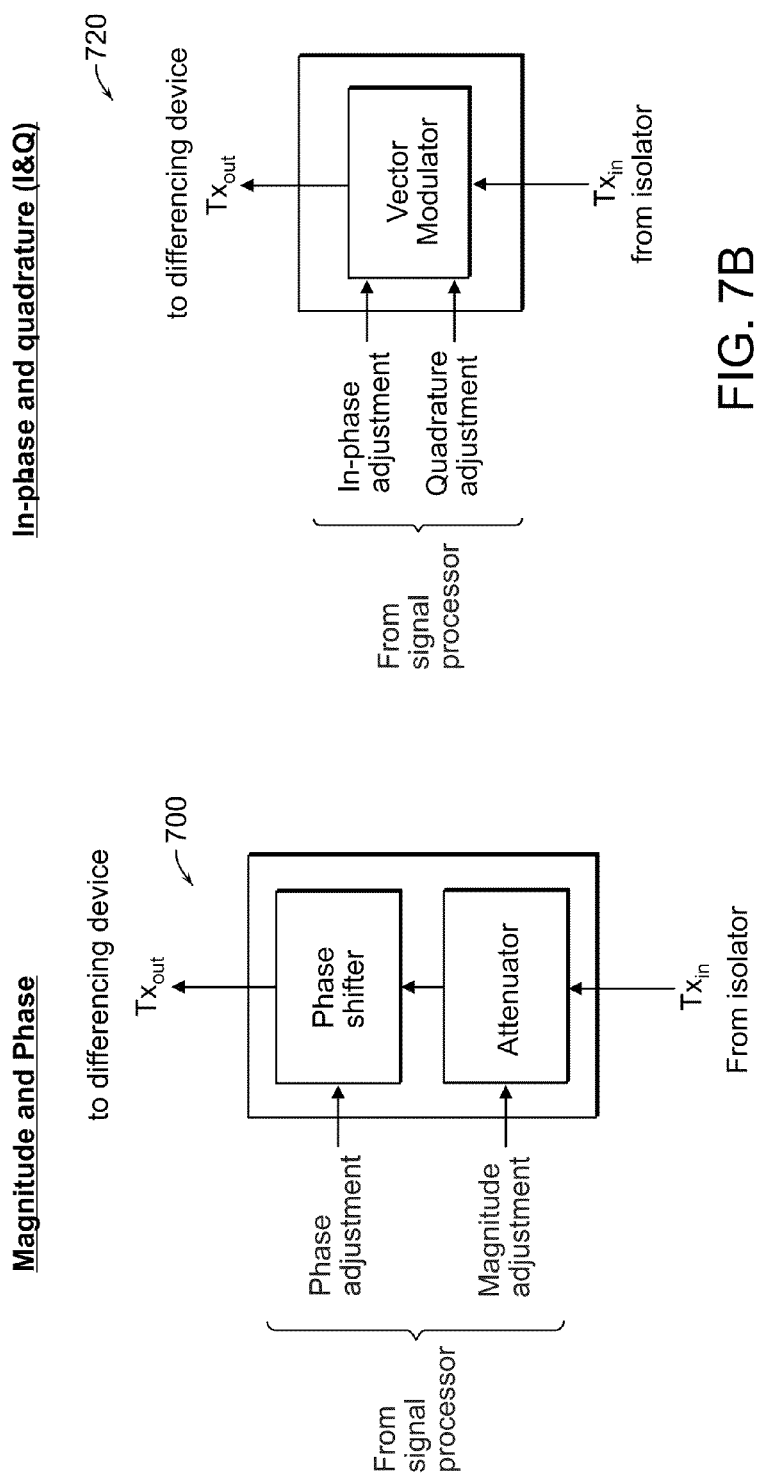
FIG. 7A shows an adjustment circuit that adjusts the magnitude and phase of the transmit signal that can be used with the same-aperture any-frequency STAR system according to the present teaching.
FIG. 7B shows an adjustment circuit that adjusts the in-phase and quadrature components of the transmit signal that can be used with the same-aperture any-frequency STAR system according to the present teaching.

FIG. 7 illustrates transmit signal adjustment circuits 700, 720 that can be used with the same-aperture, any-frequency STAR system according to the present teaching. The transmit signal adjustment circuits 700, 720 make adjustments, determined by the signal processor, to the complex value of the transmit signal. The signal adjuster can adjust upon either the transmit signal at RF frequencies or at its down-converted IF frequencies. If the signal adjuster operates at the IF frequencies, then the adjuster will need to be followed by a frequency up-converter, using one of numerous known techniques for frequency up-conversion. There are numerous types of signal adjustment circuits that can be used with the same-aperture, any-frequency STAR system according to the present teaching, two of which are shown in FIGS. 7A and B. FIG. 7A illustrates an embodiment of an adjustment circuit 700 that adjusts the magnitude and phase of the transmit signal. FIG. 7B illustrates an embodiment of an adjustment circuit 720 that adjusts the in-phase, in-quadrature components of the transmit signal.

Figure 8:
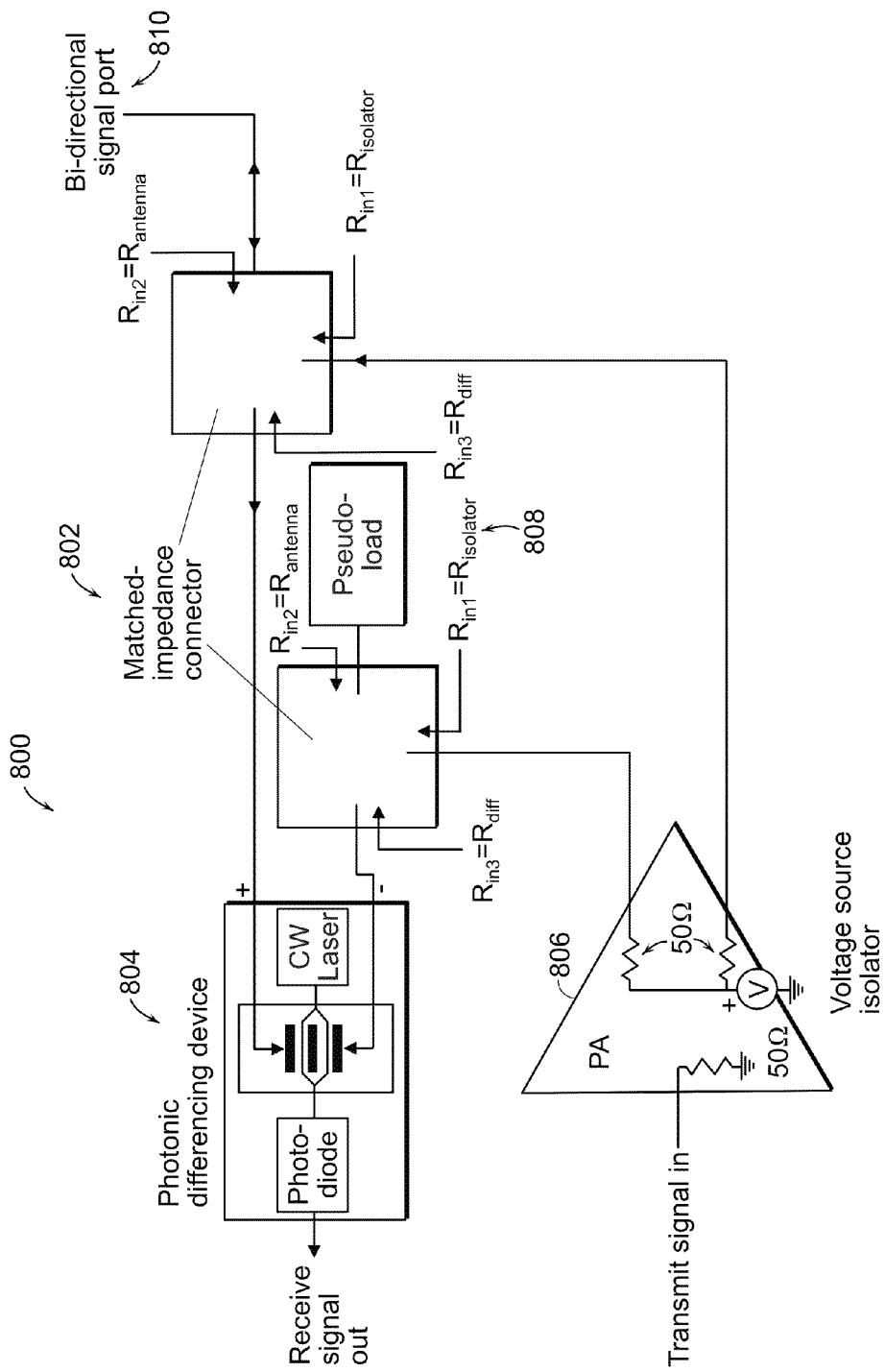
FIG. 8 illustrates a block diagram of one exemplary embodiment of a front-end system that includes the matched impedance signal connector, the photonic differencing circuit and the electronic voltage-source-based isolator described herein.

FIG. 8 illustrates a block diagram of a front-end system 800 that includes the matched impedance signal connector 802, the photonic differencing circuit 804 and the voltage-source isolator 806 as described herein. The system 800 passively reduces, and ultimately even eliminates, the need for the transmit signal adjustment device and the signal processor described herein. To accomplish this goal, the circuits on the two sides of the differencing device 804 are made as identical as possible. To this end, a pseudo-load impedance 808 can be constructed, which is a circuit that replicates as closely as possible the impedance vs. frequency function of the bi-directional port 810 load impedance.

To further establish as good a balance as possible between the two inputs to the differencing device, identical connectors are used; in this case, the matched impedance type can be used. This example system uses the photonic differencing device described herein. Key advantages of this type of differencing device or subtractor are that they are extremely wide bandwidth (>4 decades) and there is high isolation between the + and − differencing ports. Voltage source isolation, with identical output impedance in the two outputs, further enhances the balance. One of the disadvantages of this system architecture is the relatively high loss incurred by the transmit signal. Because the same transmit power is supplied to both the antenna and the pseudo-load, there is 3 dB of loss for ideal (i.e., lossless) connectors. There is an additional 3 dB loss at each of the connectors. Thus, the total transmit loss between the output of the power amplifier and the antenna is 6 dB plus the excess loss of the connector.

Figure 9:
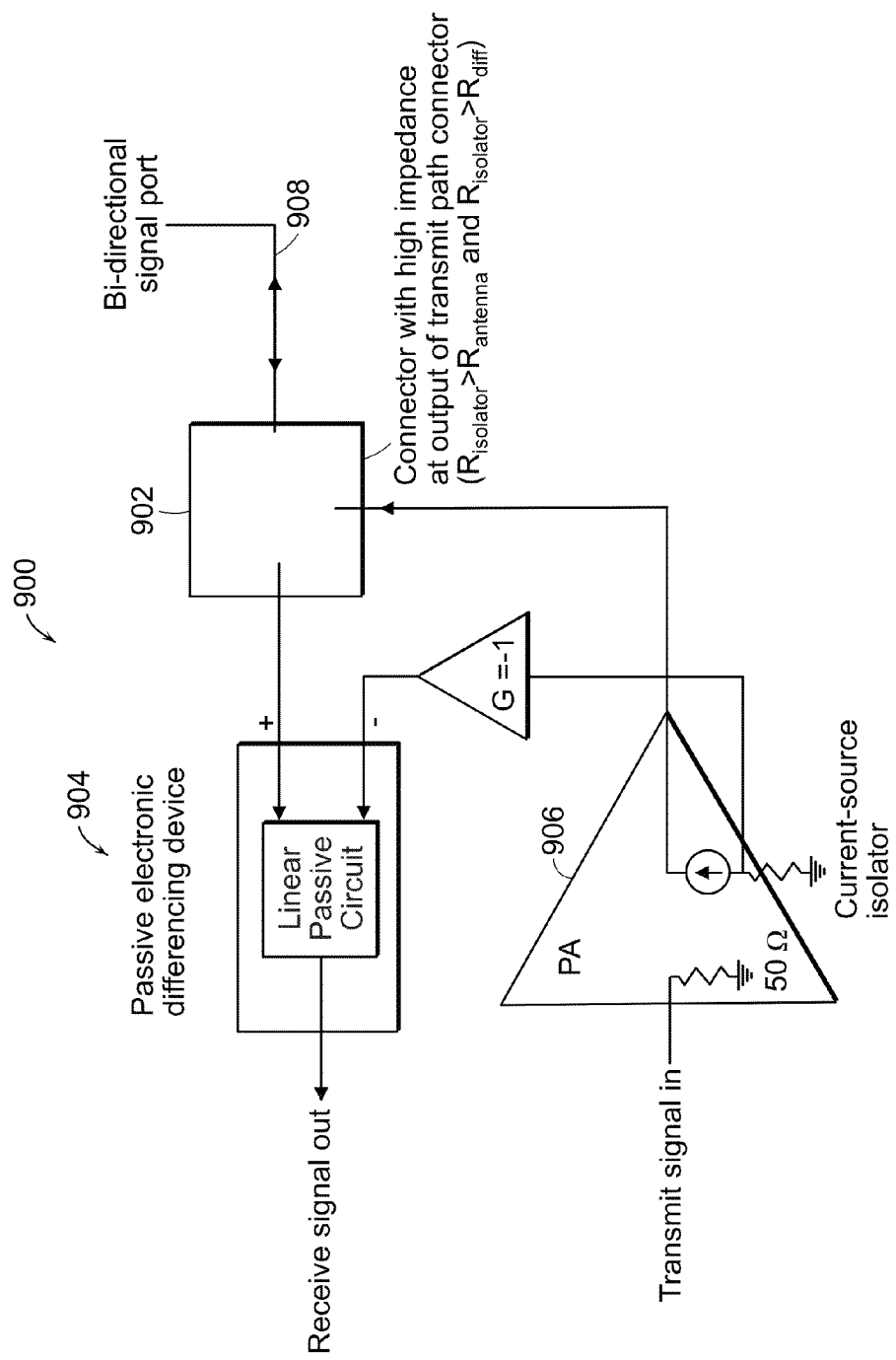
FIG. 9 illustrates a block diagram of one exemplary embodiment of a front-end system that includes the signal connector to which a high impedance is presented by the output of the transmit signal path, the passive electronic differencing device, and the current-source-based isolator described herein.

FIG. 9 illustrates a block diagram of one exemplary embodiment of a front-end system 900 that includes the signal connector 902 to which a high impedance is presented by the output of the transmit signal path, the passive electronic differencing device 904, and the current-source-based isolator 906 described herein. This is compatible with the version of the connector that has a high impedance on the port that connects to the transmit path output. In this system 900, the impedances on the other two connector ports are matched: the bi-directional port provides the load to the bi-directional port 908 impedance and the differencing port is loaded by one input to the differencing device 904, which in this system 900 is of the passive electronic type. The passive electronic differencing device 904 has a narrower bandwidth than the photonic differencing device described herein. However, it has slightly lower transmit loss: 4.77 dB ideally, vs. 6 dB for the architecture shown in FIG. 8.

Figure 10:
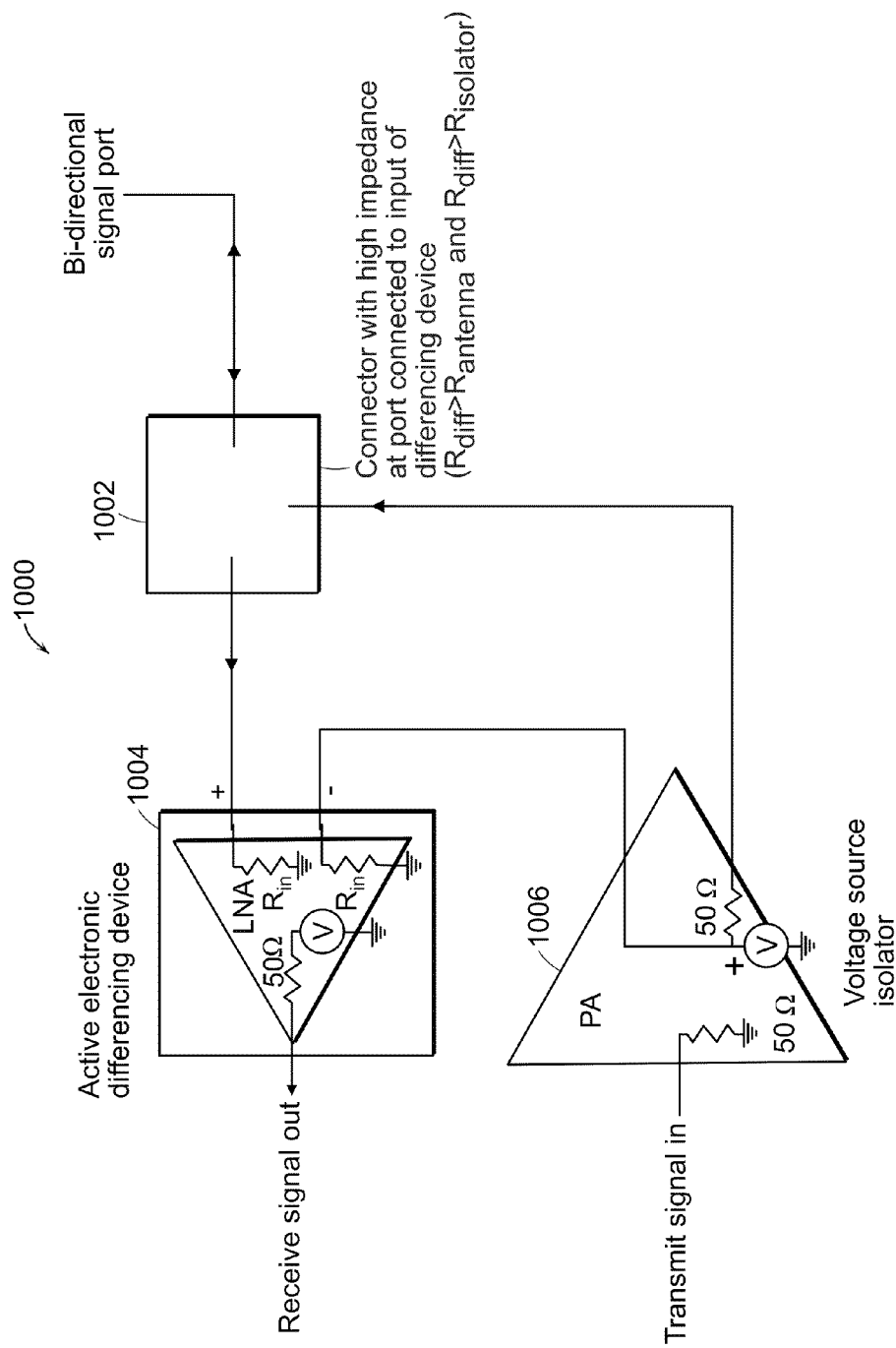
FIG. 10 illustrates a block diagram of one exemplary embodiment of a front-end system that includes the connector with a high impedance applied to the output receive signal port by the '+' port of the active electronic differencing device, and the voltage-source-based isolator described herein.

FIG. 10 illustrates a block diagram of one exemplary embodiment of a front-end system 1000 that includes a signal connector 1002 with a high impedance applied to the output receive signal port by the '+' port of the active electronic differencing device 1004, and the voltage-source-based isolator 1006 described herein. One potential advantage of differencing devices 1004 of this type is that the input impedance can be made higher than the system impedance. For example, a common system impedance is 50Ω. The input impedance of the active electronic differencing device 1004 can range from 500Ω for some implementations to >1 MΩ for other implementations. This means that the signal power drawn by the differencing device inputs can be negligible. Therefore, it is advantageous to select a connector type that is designed to work with a high impedance at its port that feeds the differencing device, and to use the voltage type of isolators whose isolated output is designed to feed a high impedance. Hence the system configuration that is shown in FIG. 10 contains both a voltage source isolator 1006 and a signal connector 1002 with high impedance at its differencing device port. One of the key features of this implementation is that the transmit loss is now 0 dB, at least in the ideal case.

Some embodiments of the present teaching use sampling. As is well known, ideal sampling would occur instantly, i.e. in zero time. In practice sampling is accomplished over a finite, non-zero sampling time. The time between sampling times is referred to herein as the inter-sampling interval (ISI).

In all prior known applications of sampling, the focus is on sampling times that are considerably less than the ISI. To recover the original waveform from such samples requires passing the samples through a low pass filter whose bandwidth equals the bandwidth of the original signal. However, direct recovery of the original signal from the samples is rarely done. Instead the samples are commonly converted to digital representation via an analog to digital converter (ADC), for subsequent digital signal processing. Hence in conventional thinking, sampling is synonymous with the first step in the digitization process. In the present teaching we wish to focus on sampling per se, i.e. on sampling that is not necessarily followed by an ADC.

Long sampling times, i.e. where the length of the sampling time is much greater than the ISI, can not be used to feed an ADC since the input to the ADC is continuously changing. In the limit of long sampling times, where the ISI goes to zero, the entire waveform is passed through the sampler unchanged. Thus, no additional processing is needed to recover the waveform from the samples.

Although Nyquist sampling preserves all the information in a band-limited waveform, it does not preserve all the power in the waveform. In other words, sampling preserves the energy in the sample but not the power in the waveform. This can be an issue when the power in the waveform is required, such as when the waveform is to be transmitted from an antenna.

Thus, one aspect of the present teaching is that by sampling the incoming waveform, the information contained in the incoming waveform can be preserved if the waveform is band-limited and the sampling occurs at a sampling rate that is at least the Nyquist rate. Under these conditions, all the information in the incoming waveform will be contained in the samples. By further using a short sampling time for the incoming waveform there will be a long ISI between the incoming waveform samples. If this long ISI is used as the sampling time for the outgoing waveform, then most of the outgoing waveform's power will be preserved.

The power of the outgoing signal relative to the power of the incoming signal introduces a further design consideration. When the outgoing signal power is less than the maximum power of the incoming signal, which could be defined in any of a number of ways (linear dynamic range and 1 dB compression power are two common examples), then it will be possible to suppress the outgoing signal that appears in the incoming signal path by using signal processing (see e.g. FIG. 2, block 212) without the need for the subtractor (FIG. 2, block 210).

However, if the outgoing signal power is greater than the incoming signal power some means of suppressing the outgoing signal power that enters the incoming signal path will be needed that at least suppresses the power of the outgoing signal in the incoming signal path to below the maximum power the incoming signal path can handle. By appropriately timing the sampling of the incoming and outgoing signals, sampling offers an option for augmenting, or even eliminating, the suppression provided by the subtractor (see, e.g. FIG. 2, block 210). For example, if the fast switch, FIG. 3D, block 360, is used as the connector (see, e.g. FIG. 2, block 202) then the samples of the incoming and outgoing signals are guaranteed not to overlap in time since only one of the two signals is connected to the bi-directional port at any time. In this case, the outgoing signal is completely suppressed in the incoming signal path, assuming the isolation of the off port of the switch is infinite. One skilled in the art will appreciate that both electronic and photonic means are known to achieve switches with high off isolation.

Figure 11:
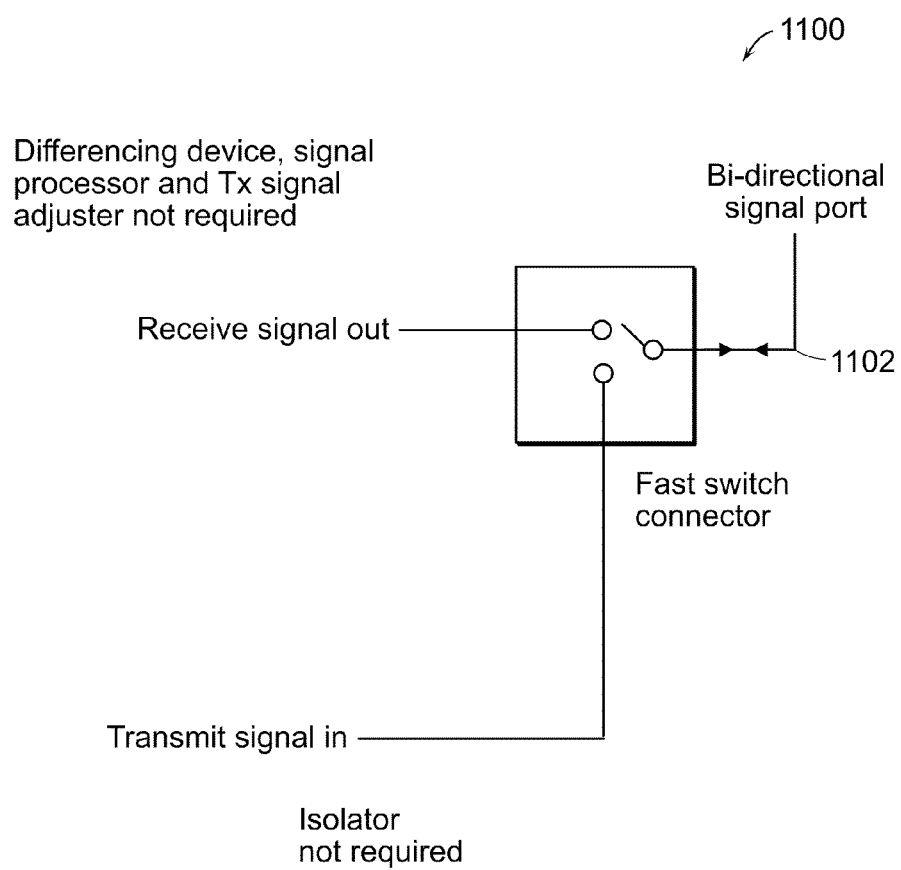
FIG. 11 shows a same-aperture any-frequency STAR system using a fast switch as a signal connector.

FIG. 11 shows a same-aperture, any-frequency STAR system 1100 using a fast switch as a signal connector. The configuration can lead to a particularly simple implementation of the present teaching. The basis of operation of this implementation can be understood as follows. It is well known to those in the art that a continuous signal can be completely characterized by sampling it at a rate that is at least twice the highest frequency of the continuous signal, $F_{max}$. This is often referred to as the Nyquist Sampling Theorem. One of the consequences of Nyquist sampling is that it is not necessary to continuously monitor a continuous signal; observing, i.e., sampling, a continuous signal at its Nyquist rate is sufficient. Instantaneous sampling, i.e. in zero time, is obviously a theoretical abstraction. For practical engineering purposes, a sample is considered to be instantaneous if the length of the sampling interval is short compared to the interval between samples. For example, a sampling pulse that lasts for even 1% of the time interval between samples is often considered sufficiently short that it approximates the theoretically ideal sampling.

To implement sampling, one can use a fast switch that is capable of connecting the input, which in this case is the signal coming from the bi-directional port 1102, to the receiver for the short period of time of the sample, and then opening (i.e. disconnecting), the input from the receiver. In some embodiments, the switching time of the fast switches is a small fraction of the sampling instant. In some embodiments, the switching time is 10% of the sampling instant. In some embodiments, the switching time is 5% of the switching time. In one embodiment, the switching time is 1% of the switching time. Thus, in this embodiment, the remaining 99% of the time between samples, the sampling switch is open, and hence the receiver is not connected to the input. The fast switch connector 1100 utilizes the inter-sampling interval to connect the transmitter to, e.g. an antenna. There is negligible transmitter power loss since the transmitter is connected to the antenna for almost 100% of the time. With the fast switch signal connector, the transmitter and the receiver are never simultaneously connected to the antenna. Hence, the transmit signal does not have the opportunity to enter the receive path. This can eliminate the need for the differencing device, isolator, signal processor, and transmit signal adjuster described herein, for some applications.

Perhaps the most common form of sampling is to sample the waveform periodically with periodicity $T=\frac{1}{2}F_{max}$. The Nyquist sampling frequency or Nyquist rate is 1/T. Since Nyquist's original work, there have evolved many known alternative sampling strategies, such as sub-sampling, which is for the sampling of non-baseband signals whose bandwidth occupies higher Nyquist zones (baseband sampling corresponds to sampling where the signal occupies the $1^{st}$ Nyquist zone). In sub-sampling, the samples are taken at a rate that is at least twice the information bandwidth of the signal, as opposed to twice the carrier frequency onto which the information is modulated. See, for example, C. E. Shannon, "Communication in the Presence of Noise", Proc. IEEE, vol. 86, No. 2, pp 447-457. Note that the Nyquist rate is a sufficient condition for perfect signal reconstruction, not a necessary condition. This has lead to known sampling techniques, other than fixed-rate Nyquist sampling with periodicity $T=\frac{1}{2}F_{max}$, that can be used in various embodiments of the present teaching. For example, some sampling techniques sample signals using a sampling waveform that sample at a lower rate than a fixed-rate Nyquist sampling rate, but are still able to reconstruct the signal by taking advantage of the sparsity of the signal. Sparse signals exhibit low or zero coefficients when represented in a particular domain (e.g., time domain, frequency domain, or other). This is the case for signals that exhibit redundancy, and reduces the number of samples that are needed to reproduce the signal. This type of sampling is known as compressive sampling. There are also known compressive sampling techniques that distribute the samples non-uniformly in time. In addition, there are oversampling techniques in which the signal is sampled at many times the Nyquist rate. Oversampling reduces noise, avoids aliasing, and improves resolution. In some embodiments, oversampling might sample 20 times the highest frequency of the continuous signal, $F_{max}$.

To implement sampling, some embodiments of the current teaching use a fast switch that is capable of connecting the input, which in this case is the signal coming from the antenna (See FIG. 11) to the receiver for the short period of time of the sample, and then opening, i.e. disconnecting, the input from the receiver. As described above, this means that for the remaining 99% of the time between samples, the sampling switch is open, and hence the receiver is not connected to the input.

It is important to point out that, while the fast switch is topologically similar to a conventional transmit-receive (T/R) switch in systems not designed for STAR, the function of the fast switch connector shown in FIG. 3D is distinct. In the case of a conventional T/R switch, the switch only needs to operate with speeds between tens of milliseconds and one second. Hence, a conventional T/R switch does not operate fast enough to perform the sampling function, which is central to the present operation.

Although in some system applications, sufficient performance may be achievable using the same-aperture any-frequency STAR systems described in FIGS. 2-11, in other system applications it will be necessary to augment the front end performance with signal processing techniques. In any embodiment of the present teaching, signal processing can be incorporated with the front end to achieve enhanced performance. As will be evident to those skilled in the art, it is possible to augment any of the front end systems described herein with signal processing; we illustrate this by selecting to augment the example front end system architecture shown in FIG. 10.

Figure 12:
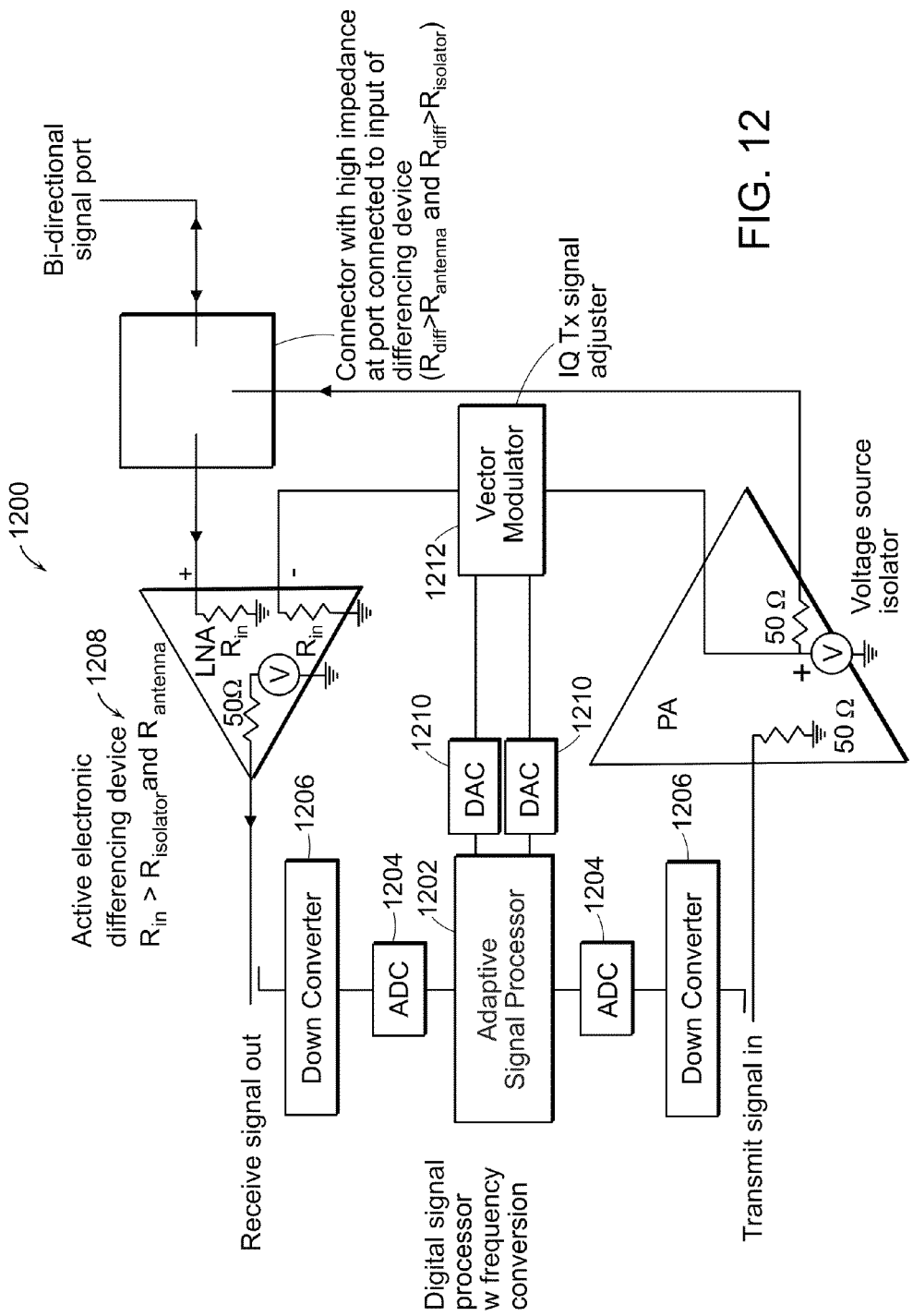
FIG. 12 shows a block diagram of a same-aperture any-frequency STAR system using digital signal processing to augment the example front end system shown in FIG. 10.

FIG. 12 shows a block diagram of a same-aperture any-frequency STAR system 1200 using digital signal processing 1202 to augment the example front end system shown in FIG. 10. This example system uses the digital signal processor with down conversion described in connection with FIG. 6B. Also, this example system uses the vector modulator type of transmit signal adjuster described in connection with FIG. 7B. A portion of the output of the differencing device is fed to a downconverter 1206 that translates the frequency spectrum of the signal down to a lower frequency, which can be an intermediate frequency (IF). Alternatively, it can be translated all the way down to zero frequency, which is more commonly referred to as baseband. A portion of the transmit signal is also downconverted, with the constraint that it be converted to the same frequency to which the output of the differencing device was converted. Once both these signals have been downconverted, they are converted to digital form via analog-to-digital converters (ADC) 1204.

In the digital domain, the digital signal processor 1202 is used to correlate the transmit signal with the differencing device 1208 output to isolate the residual transmitter component in the differencing device 1208 output. The signal processor 1202 then forms an estimate of the optimum complex value of the transmitter signal that needs to be injected into the differencing device 1208 so as to minimize the residual transmitter signal that is present at the differencing device 1208 output. The output of the signal processor 1202 includes two signals that contain the desired settings on the IQ transmit signal adjuster 1212. Since in this example shown in FIG. 12, we are using a vector modulator as the IQ transmit signal adjuster 1212, the complex settings are for the in-phase (I) and quadrature (Q) portions of the transmitter signal. Since many vector modulators require analog inputs, FIG. 12 shows digital-to-analog converters (DACs) 1210 to execute the required conversion.

FIG. 12 shows the IQ transmit signal adjuster 1212 operating on the Tx signal at RF frequencies using the complex settings supplied by the adaptive signal processor 1202 and DACs 1210. It is also possible for an adaptive signal processor and DAC to generate the adjusted transmit signal itself at IF frequencies, and to up-convert it to RF frequencies, as described in connection with FIG. 21 along with the advantages of that approach. Operating on the Tx signal at RF frequencies, as shown in FIG. 12, has the advantage that it obviates the need for frequency up-conversion.

Figure 13:
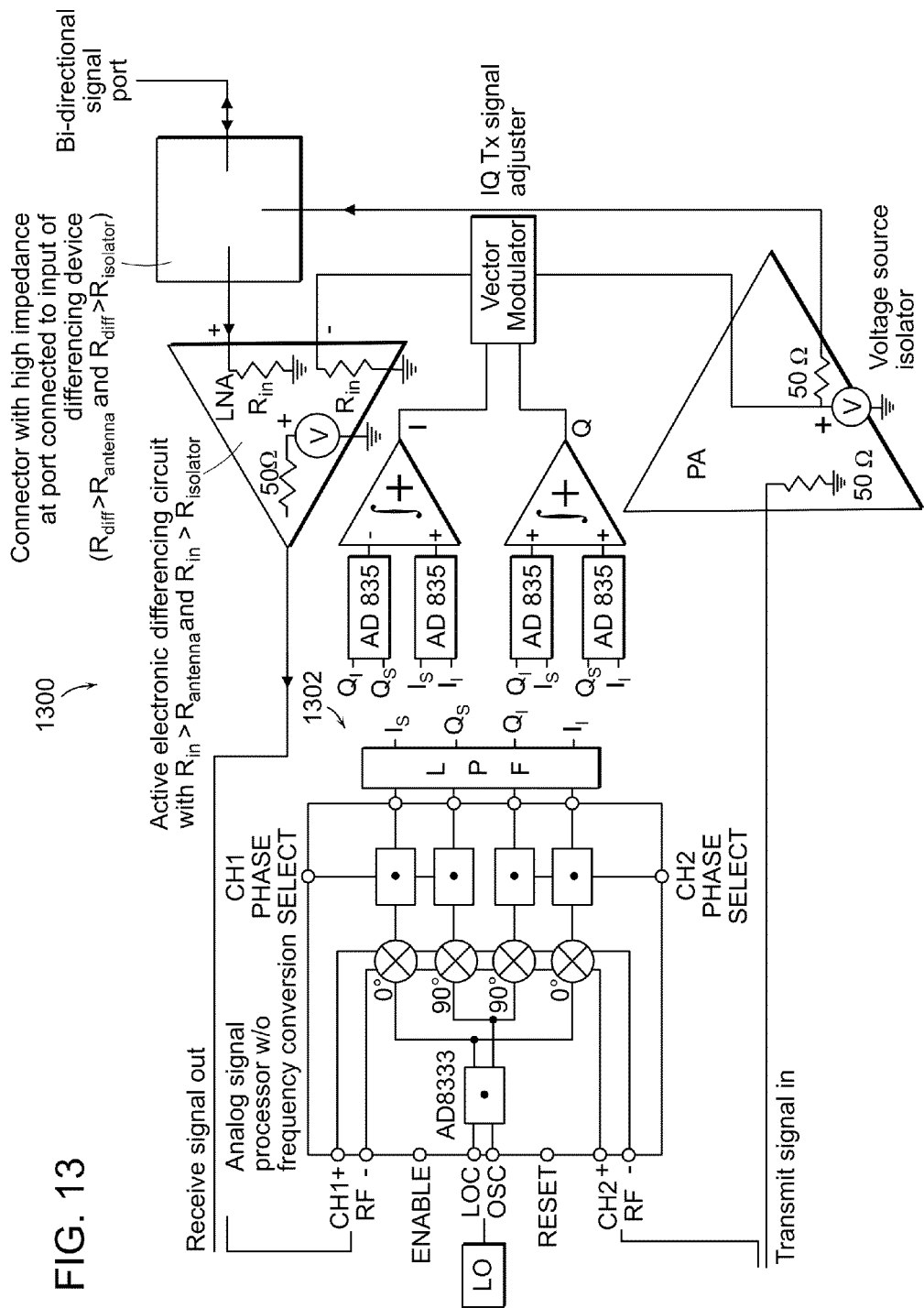
FIG. 13 shows a block diagram of a same-aperture any-frequency STAR system illustrating how analog signal processing could be used to augment the example front end system shown in FIG. 10.

FIG. 13 shows a block diagram of a same-aperture any-frequency STAR system 1300 illustrating how analog signal processing could be used to augment the example front end system shown in FIG. 10. For this example system, we have selected the analog signal processor 1302 without frequency conversion, as described in connection with FIG. 6C. Since the transmitter and differencing device outputs are analog signals, the analog signal processor 1302 does not require analog-to-digital converters. One way that the required processing can be performed is with an integrated circuit that contains many of the functions, such as the AD8333, which is a dual I/Q demodulator commercially available from Analog Devices. The required analog multiplications also can be performed with integrated circuits, such as the AD835, which is a voltage-output, 4-quadrant multiplier, also commercially available from Analog Devices. The output of the analog multipliers, with appropriate summing, scaling, and integration, can drive the vector modulator inputs directly without the need for digital-to-analog coverers.

Referring back to FIG. 2, in some methods of operation, the two versions of the transmit signal arriving at the subtractor 210 inputs are processed to have the same delay. This can be accomplished by inserting a delay in path 206 that matches the delays through the subtractor+signal processor+Tx signal adjuster 214+frequency conversions (if used). However, in some of these methods of operation, it is relatively difficult to accurately provide the two versions of the transmit signal at the subtractor 210 inputs with the same delay. For example, when the operating conditions are such that there is a large reflection of the transmit signal near the bi-directional port 204, then at the output of the connector 202, there will be two copies of the Tx signal that need to be cancelled, one copy that is reflected at the input to the bi-directional port impedance and the other copy that is reflected off an impedance change that is located further down the bi-directional signal path 204. Under these operating conditions, it is desirable to have a second delayed copy of the Tx signal, and to feed that copy to a second Tx signal adjuster. In one embodiment, this is accomplished using the signal processor 212 to store the Tx signal in digital form.

Figure 21:
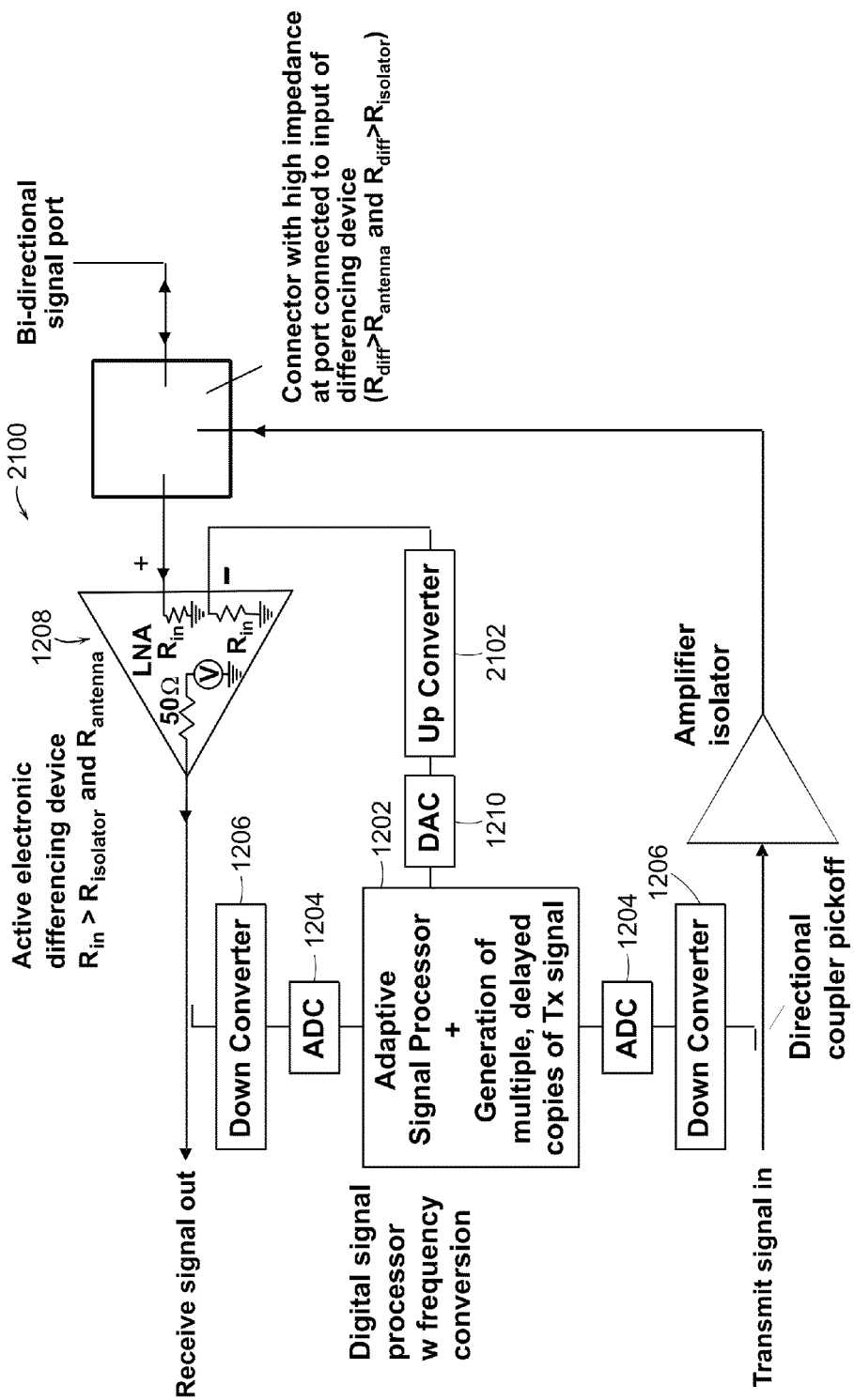
FIG. 21 illustrates a system according to the present teaching for providing multiple, delayed copies of the transmit signal to the subtractor.

Referring now to FIG. 21, which illustrates a system 2100, according to the present teaching, for providing multiple, appropriately delayed copies of the transmit signal to the subtractor. The system described in FIG. 21 is similar to the same-aperture, any-frequency STAR system 1200 using digital signal processing 1202 that was described in connection with FIG. 12. The system 2100 includes the active electronic differencing device 1208, downconverters 1206, and analog-to-digital converters 1204 in the system 1200. However, in the system 2100, the adaptive signal processor 1202 also includes a means for generating multiple delayed copies of the Tx signal. The adaptive signal processor 1202 is electrically connected to a digital-to-analog converter 1210 that is electrically connected to an up converter 2102, and then to the active electronic differencing device 1208.

In some modes of operation, the Tx signal is down-converted and processed by the analog-to-digital converter 1204 and then stored in the signal processor 1202. In this way, multiple, appropriately-delayed copies of the Tx signal can be generated in the digital domain and the resulting signals can be converted back by a digital-to-analog converter 1210 to an analog signal, which is then up-converted by a frequency converter, such as a mixer. Alternatively, the up-conversion can be performed digitally and then fed to a digital-to-analog converter 1210. One powerful aspect of this approach is that the appropriate delays for each copy of the transmit signal can be determined by signal processing using well known techniques. The delays can be updated as signal conditions change.

All of the embodiments of the present teaching in FIGS. 2-13 would be effective at removing the high-power transmit signal from the receive path. If the transmit signal strength is only of the same order of magnitude as, or smaller in magnitude than, the receive signal, then much less hardware may be required.

Figure 14:
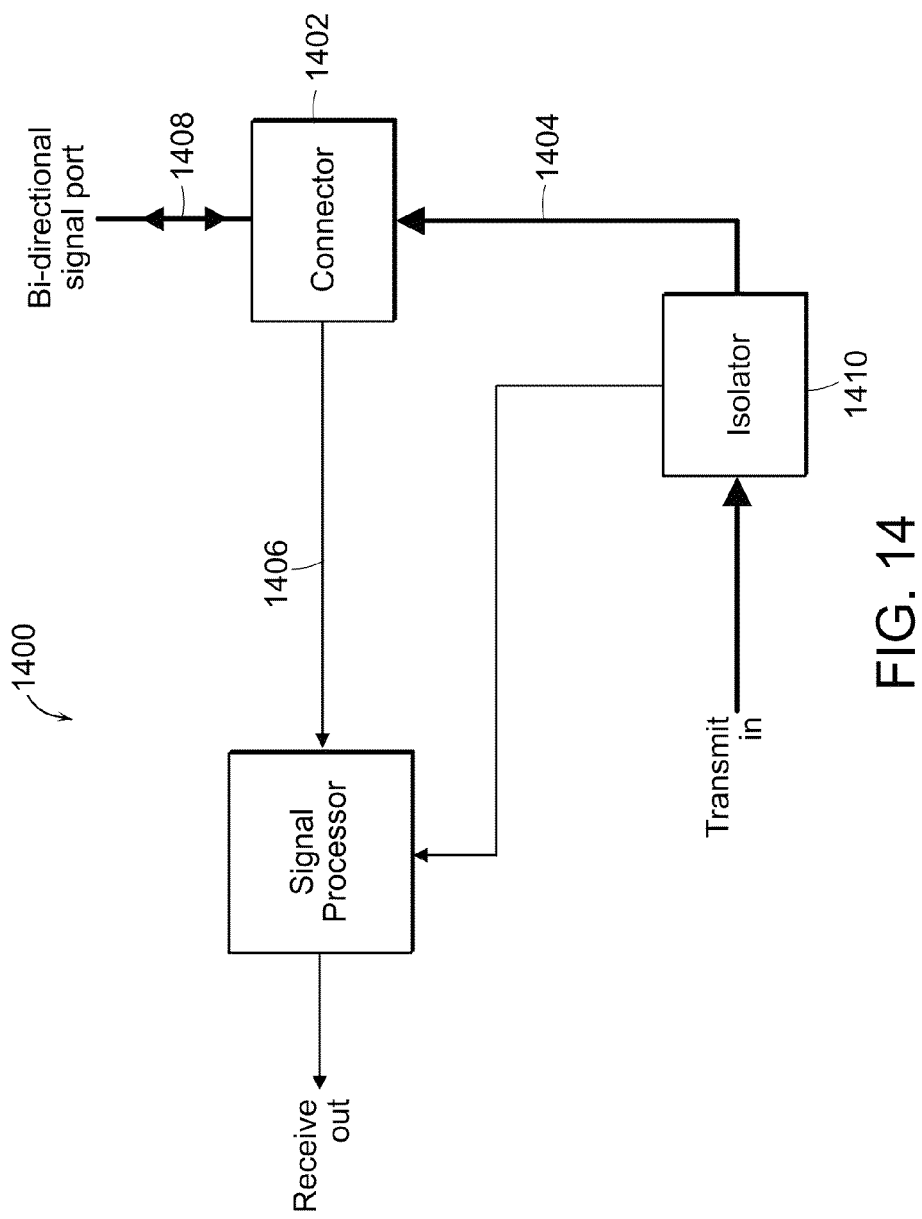
FIG. 14 illustrates a subset of hardware in the same-aperture any-frequency STAR system described in connection with FIG. 2 that is useful for some embodiments when the transmit signal strength is only as strong as or weaker than the receive signal.

FIG. 14 illustrates a subset system 1400 of hardware in the same-aperture, any-frequency STAR system, described in connection with FIG. 2, that is useful for some embodiments when the transmit signal strength is only as strong as, or weaker than, the receive signal. A three-port signal connector 1402 is necessary to permit connection of the separate transmit path 1404 and receive signal path 1406 to the bi-directional port 1408, and the isolator 1410 is necessary to shield the transmit path 1404 from the signal environment to which the bi-directional port interfaces. In one embodiment, the three-port signal connector 1402 is a ferrite circulator. An analog signal differencing device, however, may not be required, and thus neither would the transmit signal adjuster. Because the transmit signal is relatively small, it does not saturate any of the components in the receive signal path, and its removal from the receive signal path, if deemed necessary, can be accomplished using well-known digital signal processing techniques.

In many applications, a large signal that needed to be removed (subtracted) from the receive path was a signal to be transmitted through the same bi-directional signal path that was detecting a signal to be received. The transmit signal may be differentiated from the receive signal in two key aspects: (1) the transmit signal is much more powerful than the receive signal, and (2) the transmit signal does not need to be demodulated to recover the information, if any, that is being conveyed by the transmit signal. There is another class of system configurations in which a large signal that does not need to be demodulated enters the receive path. If such a large signal is benign, it is generally referred to as co-site inference. If the large signal is hostile in nature, it is generally referred to as jamming. In such cases, the large signal needs to be removed so that the receiver can process, i.e. demodulate, the desired receive signal(s). Various means of removing co-site and jamming signals are well known. One common approach is to use RF filters to suppress the large signal while permitting the receive signal(s) to pass. Such techniques are effective, of course, only when the receive and co-site/jamming signals occupy disjoint frequency bands. The teaching of the present invention will now be applied to suppress co-site and jamming signals, where the frequency spectra of the receive and co-site/jamming signals may overlap.

Figure 15:
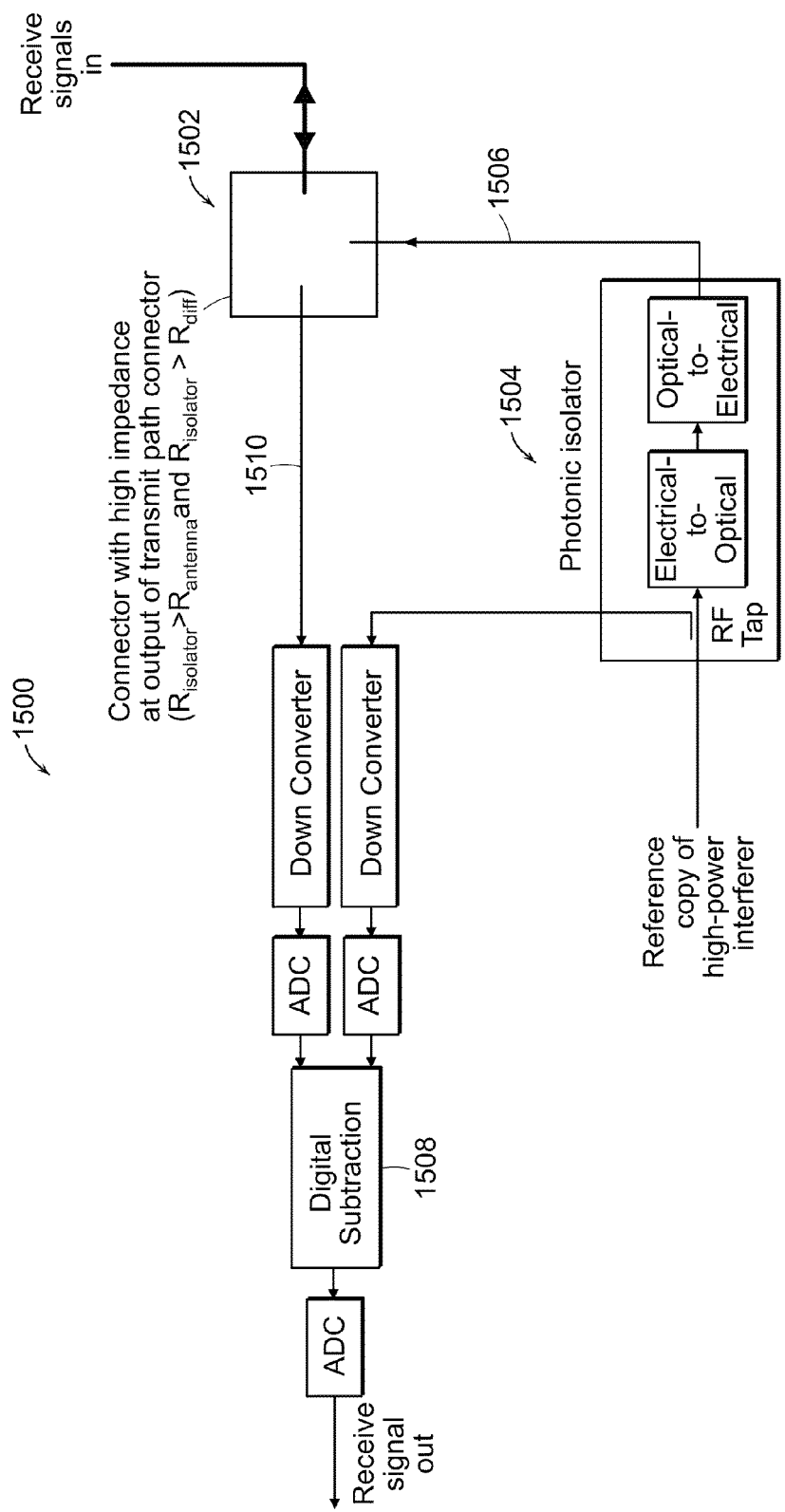
FIG. 15 illustrates one exemplary embodiment of the system described in FIG. 14, including a signal connector to which a high impedance is presented by the output of the photonic isolator in the transmit signal path, and in which conventional digital signal processing is used to remove the transmit signal from the receive path after all signals are frequency down-converted and then converted from the analog to digital domain.

FIG. 15 illustrates one exemplary system 1500, which is an embodiment of the system 1400 in FIG. 14, including a signal connector 1502 to which a high impedance is presented by the output of the photonic isolator 1504 in the transmit signal path 1506, and in which a conventional digital signal processor 1508 is used to remove the transmit signal from the receive path 1510 after all signals are frequency down-converted and then converted from the analog to digital domain. In the case of non-cooperative interfering sources, a reference copy of the interferers that is fed to the interference canceller must be self-generated. Except for the fact that problematic interferers are large in amplitude relative to the signal of interest (SOI), we often cannot assume we know anything else about these interferers at all. Therefore, to generate a reference copy of the interferers requires a way of sensing only the large interferers that may be present, and ignoring the SOI. A known method to preferentially detect the interfering source is to use directional antennas whose maximum sensitivity is pointed in the direction of the interfering source. The effectiveness of such techniques, however, is heavily dependent on the directionality of the antenna beam and the angle separation between the interfering source and the SOI. Therefore, one feature of the present teaching is an approach for extracting a reference copy of a strong interfering signal from the composite SOI+interfering signal stream that is coming from an antenna.

Figure 16:
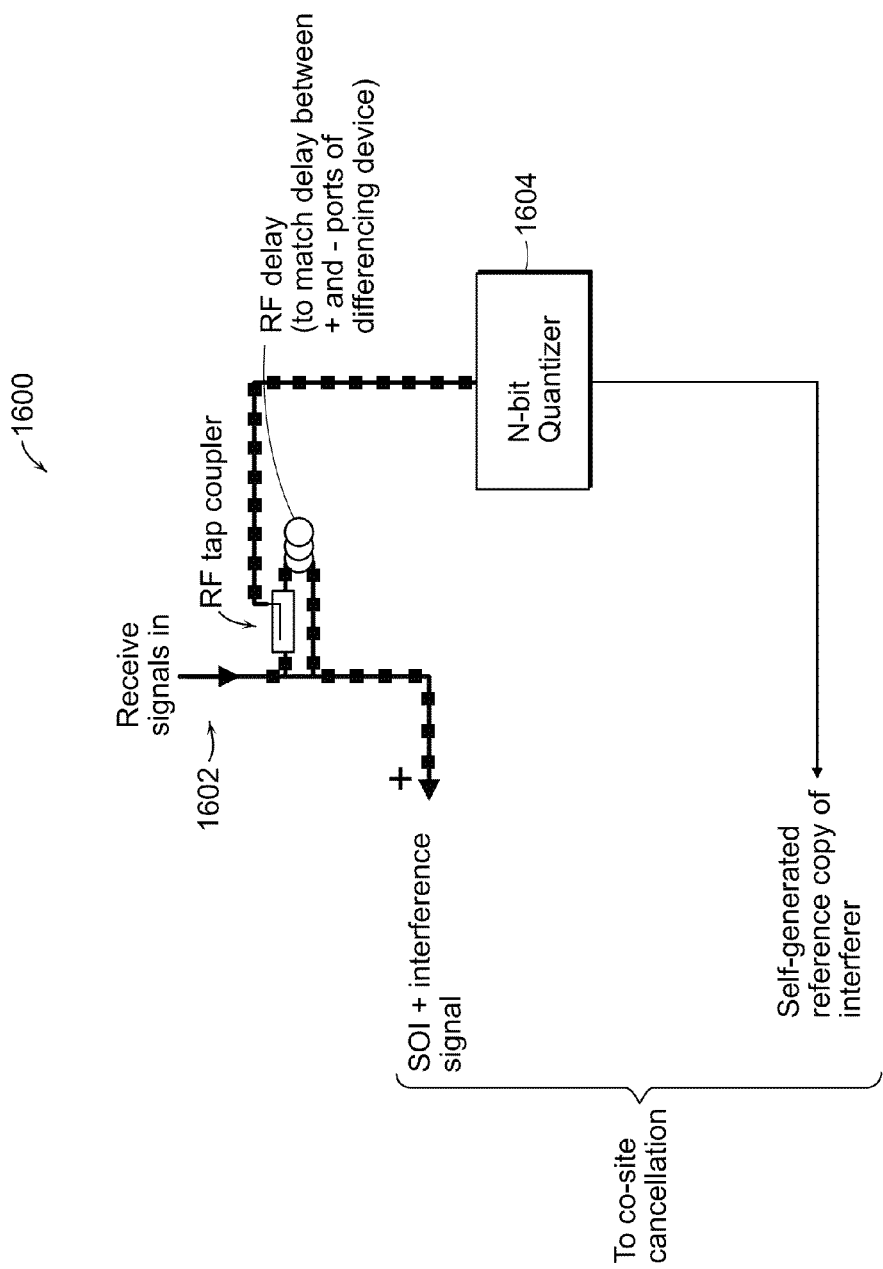
FIG. 16 illustrates a system that generates a reference copy of an interfering signal according to the present teaching.

FIG. 16 illustrates a system 1600 that generates a reference copy of an interfering signal according to the present teaching. A portion of the antenna 1602 output is tapped off and fed to an N-bit quantizer 1604, where N is sufficient to quantize the strong interferer, but not sufficiently large to also quantize the SOI, which is much smaller than the interfering signal. In this way, the N-bit quanitzer 1604 serves as a sort of a reverse limiter, letting only large signals through and suppressing smaller signals. The delay involved in producing a reference copy of the interferers in this way, and processing it in the interference canceller, can be reproduced in the signal path leading from the antenna 1602 to the interference canceller, as shown in FIG. 16. To demonstrate the operation of the self-generated reference, simulations were performed, in which the "high-power" interferer was a 1-V sine wave at 100 MHz, and the "low power" SOI was a 0.1-V sine wave at 107 MHz.

Figure 17:
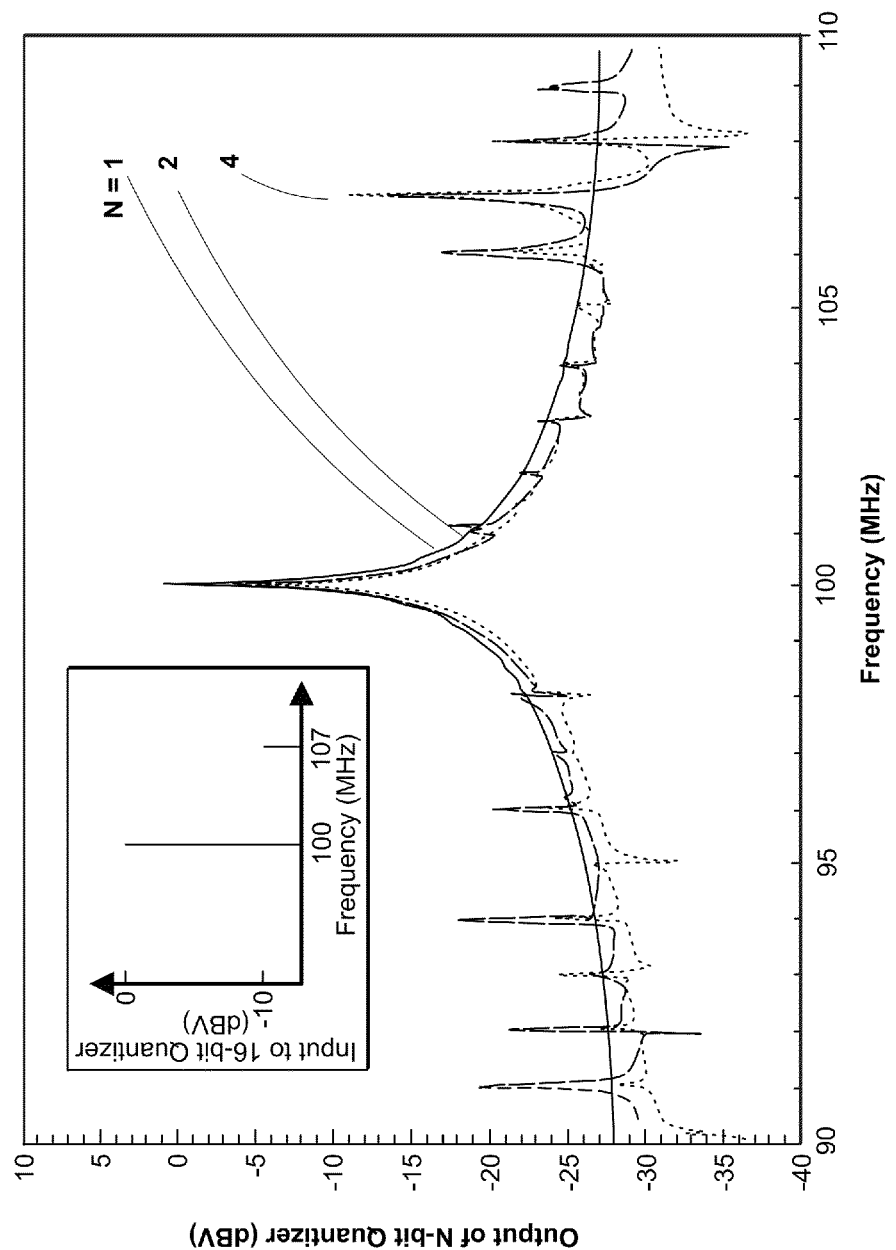
FIG. 17 illustrates results of a simulation of the architecture in FIG. 16, whereby the output of a 1-bit quantizer produces a copy of the high-power interferer at 100 MHz, allowing its subtraction from the lower-power 107-MHz SOI in a differencing device.

FIG. 17 illustrates results of a simulation of the architecture in FIG. 16, whereby the output of a 1-bit quantizer produces a copy of the high-power interferer at 100 MHz, allowing its subtraction from the lower-power 107-MHz SOI in a differencing device. The plots illustrated in FIG. 17 show the input to the N-bit quantizer, while the main plot shows the output of the quantizer, with the number of bits as a parameter. With the interferer only a factor of 10 times stronger than the SOI, a single bit of quantization "passes" the large interferer and completely fails to sense the smaller SOI, and 4 bits are sufficient to completely sense both the interferer and SOI. With 2 bits, the SOI is ~20 dB below the high-power interferer.

Given that we will wish to cancel large interferers with more complicated spectral content than the simple sinusoid, we assumed in this simulation that we will need multiple bits of quantization to preserve this content. Thus, we will only be able to effectively cancel the effect of interferers much (not just 10 dB) stronger than the SOI.

Figure 18:
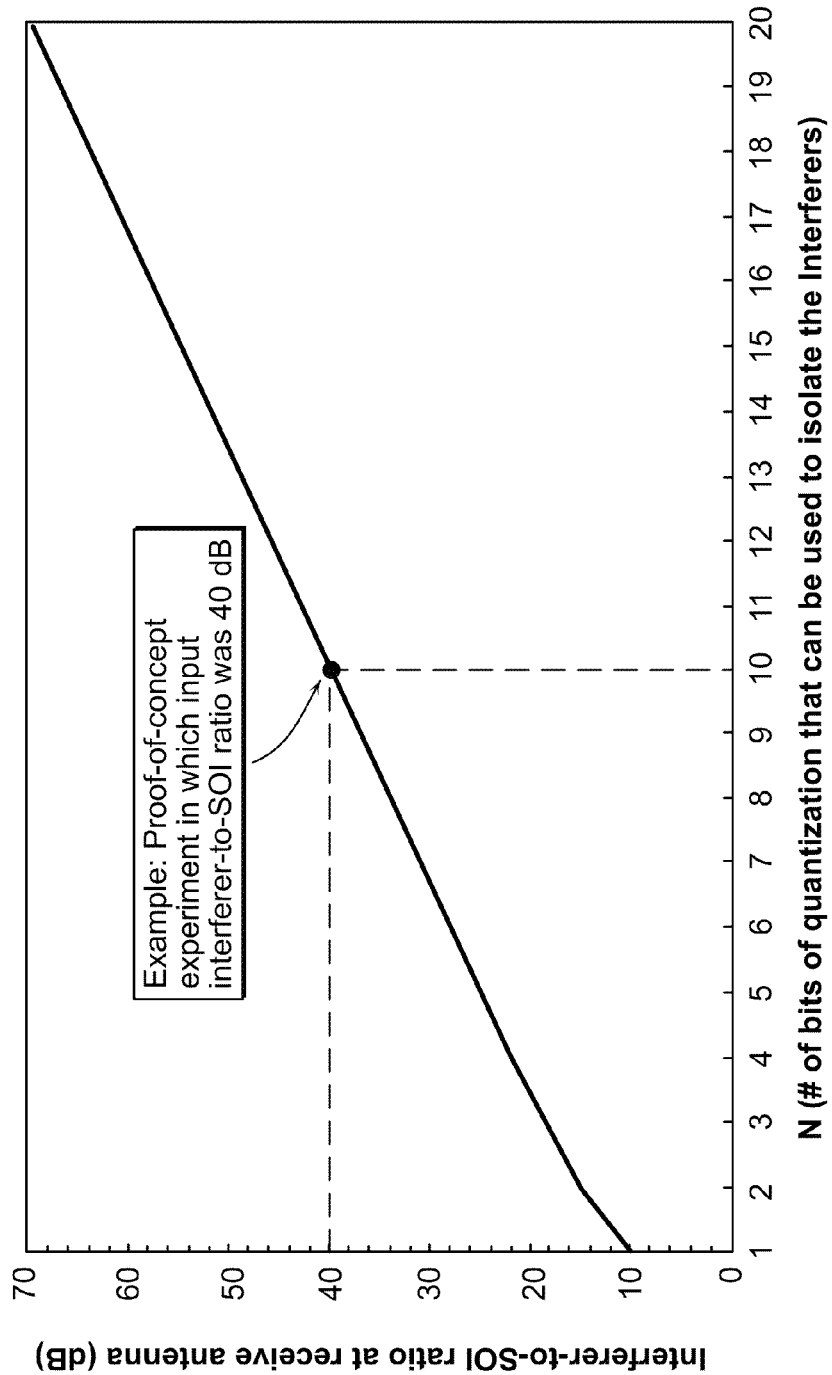
FIG. 18 is a plot that shows the relationship between the signal-to-interferer ratio at the antenna to the number of bits of quantization that we can use without having to worry about suppressing the SOI.

FIG. 18 is a plot that shows the relationship between the signal-to-interferer ratio at the antenna to the number of bits of quantization that we can use without having to worry about suppressing the SOI, which is like throwing the SOI "baby" out with the interferer(s) "bathwater." The number of bits is a metric of the complexity of the interference signal spectrum.

Figure 19:
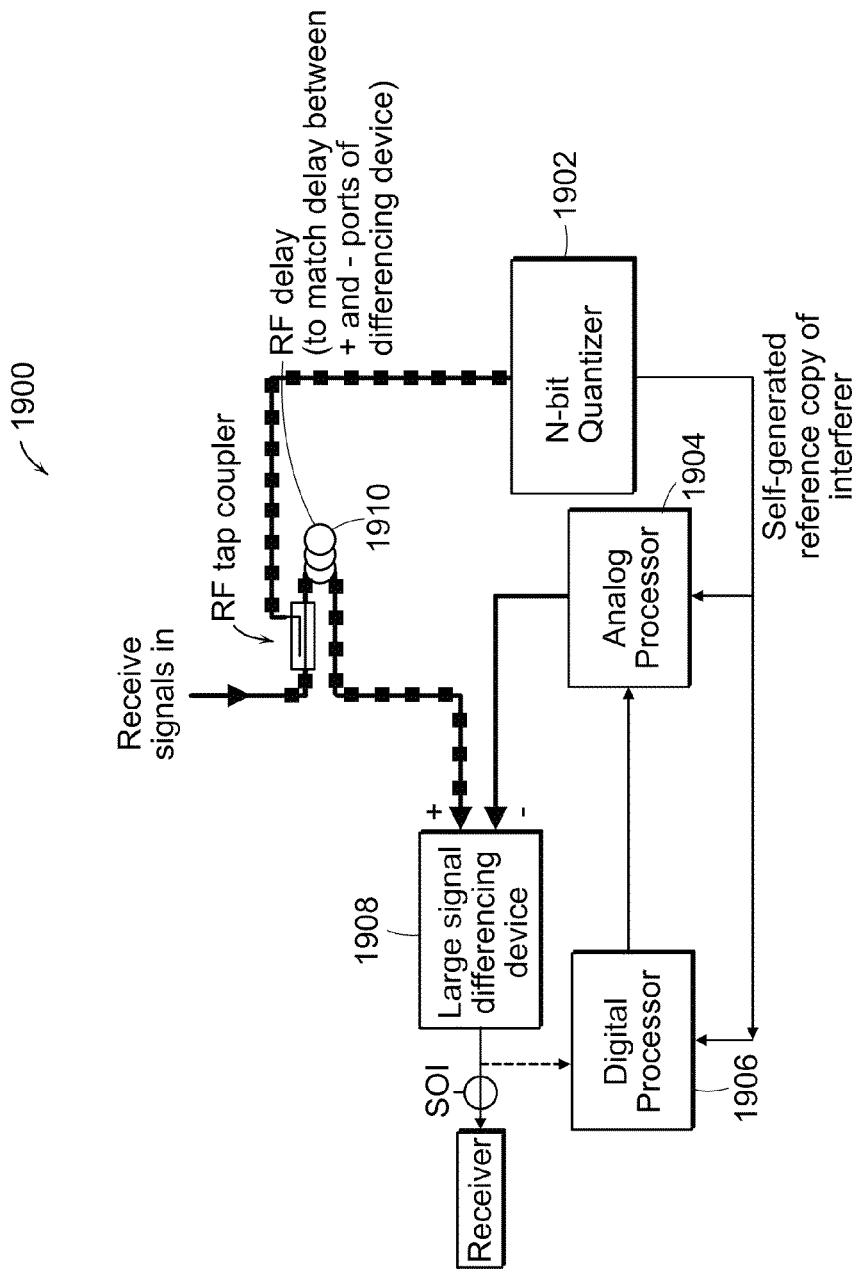
FIG. 19 illustrates a block diagram of a system according to the present teaching that uses a self-generated reference in an interference canceller.

FIG. 19 illustrates a block diagram of a system 1900, according to the present teaching, that uses a self-generated reference in an interference canceller. The system 1900 includes the N-bit quantizer 1902 that generates the reference copy of the interferer, as described in connection with FIG. 16. An analog processor 1904 and a digital processor 1906 are used in a feedback loop with the large signal differencing device 1908 to remove the interfering signal. An RF delay 1910 is used to match the delay between the + and − ports of the differencing device 1908.

In embodiments where the bidirectional signal port is connected to an antenna in FIGS. 2-19 the transmitting and receiving antenna of some embodiments consist of one radiating element addressed by one front-end. Alternatively in other embodiments, the antenna symbol in FIGS. 1, 2, 8-16, and 19 can represent an array of radiating elements all being fed the same transmit signal by a single front-end, and having their received signals combined for processing in that same front-end. In many practical systems, it is more advantageous, however, for each radiating element, or small group of radiating elements in a large array of such elements, to be addressed by its own front-end. In this case, each front-end may need to mitigate the effect of the presence in its receive signal path of not only the transmit signal being transmitted by its radiating element or small group of radiating elements, but also by the signals being transmitted by any or all of the other elements in the array whose transmitted signals will be received in part by this front-end's antenna element through a phenomenon known in the art as mutual coupling between antenna elements.

Figure 20:
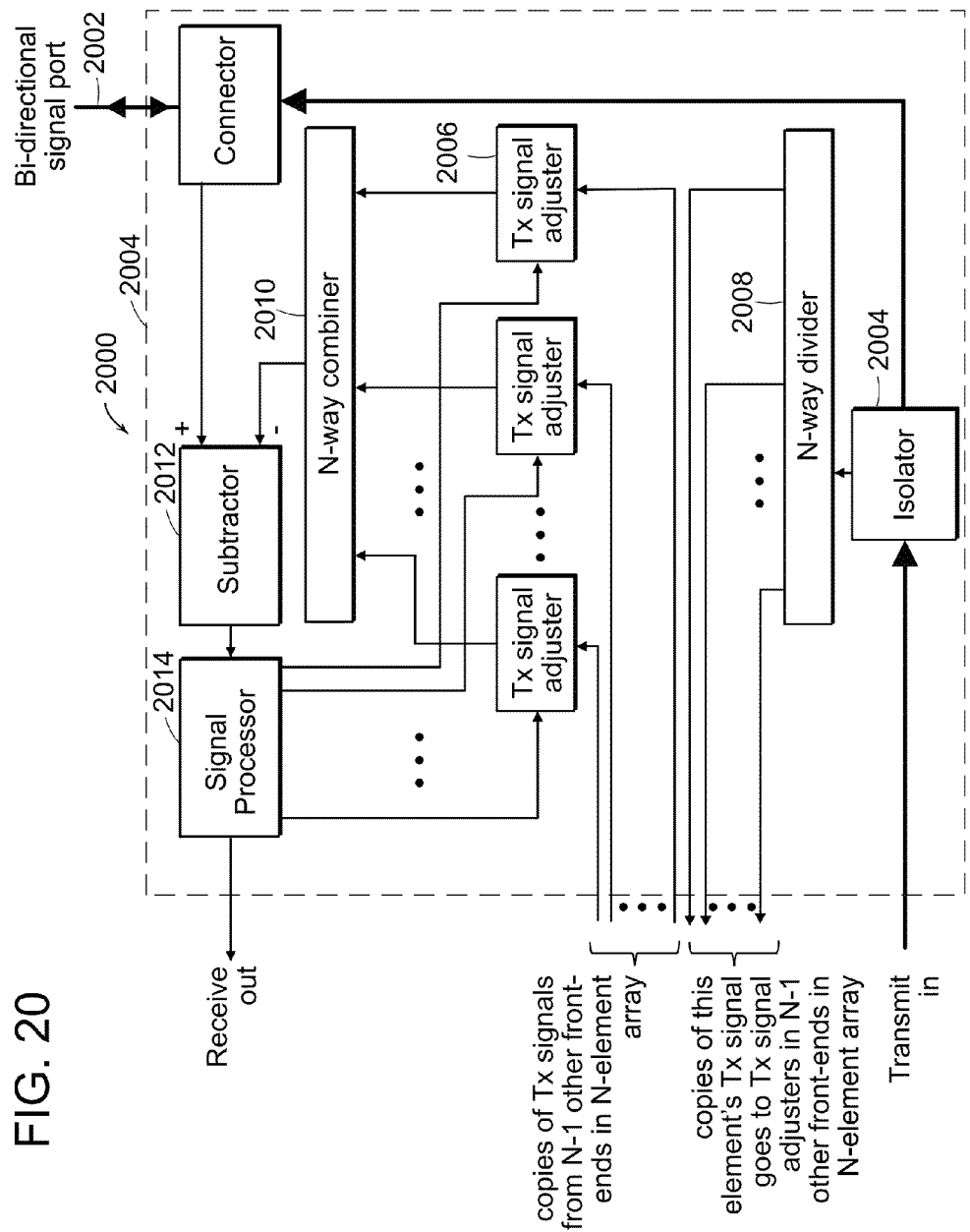
FIG. 20 illustrates a system according to the present teaching for mitigating the effect of signals being transmitted not only by an antenna element attached to the bidirectional signal port as shown by the collection of hardware inside dashed box but also by the N−1 other radiating elements in an array of N such radiating elements.

FIG. 20 illustrates a system 2000 according to the present teaching for mitigating the effect of signals being transmitted, not only by the bidirectional signal port 2002 attached to the front-end 2004 shown by the collection of hardware inside the dashed box, but also by the N−1 other radiating elements in an array of N such radiating elements.

The system 2000 is a generalized form of the single-element front-end described in connection with FIG. 2. The difference between the two figures is noticeable in that there are now a number N rather than only one transmit signal adjuster. That is one for each of the N elements in the antenna array. The copy of the transmit signal, which, in the single-antenna-system front-end of FIG. 2, the isolator 2004 provides to a single transmit signal adjuster 2006, is now split into N parts by an N-way RF divider 2008, such as two-way traveling-wave resistive power dividers (Wilkinson dividers) employed in a corporate tree arrangement to yield N-way splitting of the signal.

One of the N attenuated (by at least a factor of N) copies of the transmit signal is fed to this front-end's transmit signal adjuster 2006 exactly as was done in FIG. 2. The remaining N-1 attenuated copies of this front-end's transmit signal are routed out of this front-end, and each is connected to one of the transmit signal adjusters 2006 in each of the N-1 other bidirectional signal port 2002 front-ends 2004. Correspondingly, each of the other N-1 transmit signal adjusters 2006 in the one element's front-end 2004 shown in FIG. 20 receives an attenuated copy of the signal being transmitted by the other N-1 bidirectional signal ports 2002. These signal adjuster's 2006 outputs are combined, along with the output of the transmit signal adjuster 2006 that acts upon this antenna element's transmit signal, in an N-way RF combiner 2010, as shown in FIG. 20.

Identical to the N-way RF divider 2008, this N-way RF combiner 2010 may consist, for example, of two-way traveling-wave resistive power combiners (Wilikinson power combiners) employed in a corporate tree arrangement to yield N-way combining of the RF signals. The combined copies of the transmit signals are subtracted from the signal received by this front-end's bidirectional signal port 2002 in the differencing device 2012. As in FIG. 2, the output of the differencing device 2012 is fed to a signal processor 2014. Additionally, the signal processor 2014 receives its own attenuated copy of each element's transmit signal, as the signal processor in FIG. 2 does. For clarity, however, this feature is not shown in FIG. 20, but will be understood by those skilled in the art.

Figure 22:
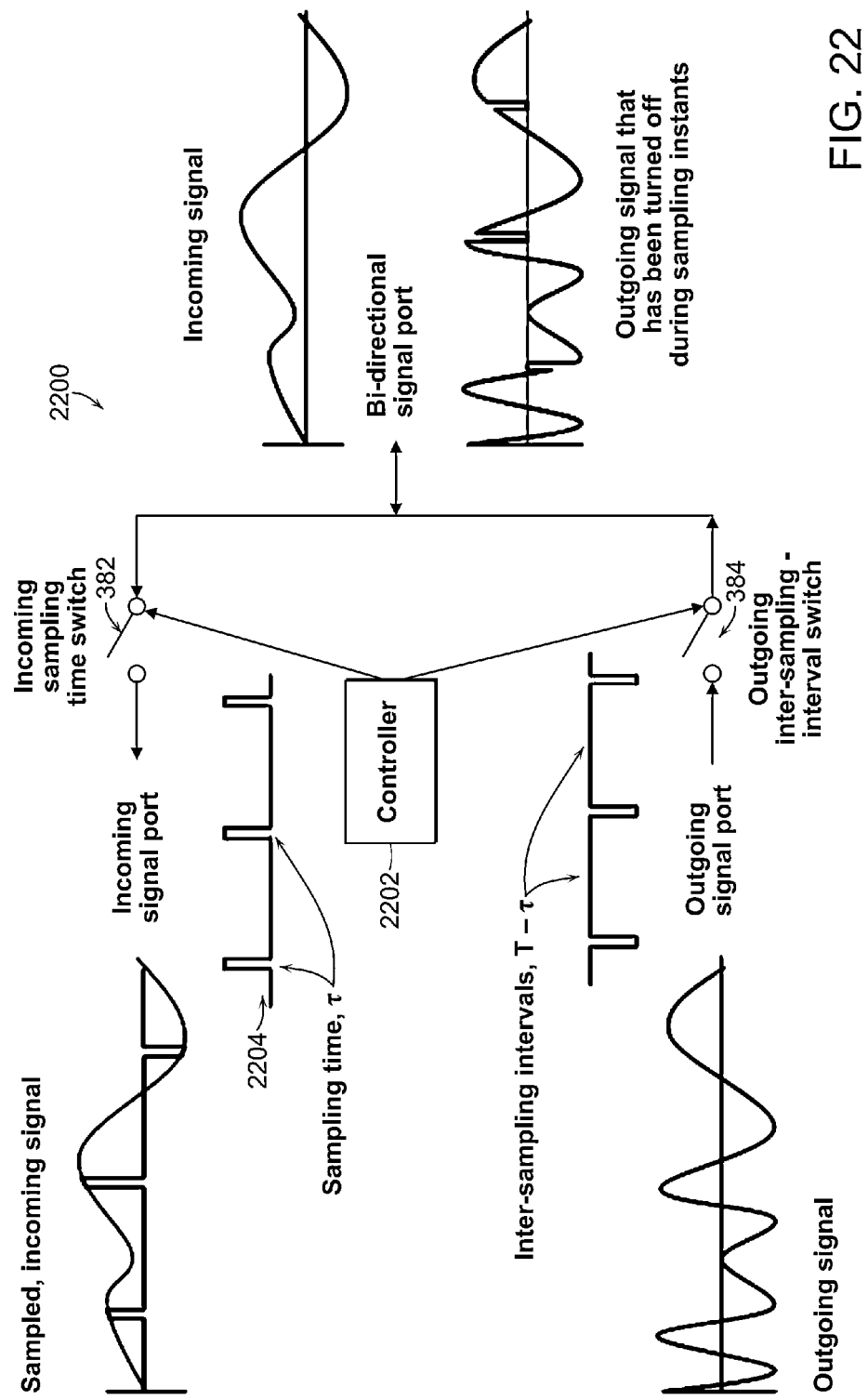
FIG. 22 illustrates an embodiment according to the present teaching for connecting a bi-directional port to both the incoming and outgoing signal ports of an RF system.

Referring to FIG. 3E and to FIG. 22, FIG. 22 illustrates an embodiment for connecting a bi-directional port to both the incoming and outgoing signal ports of an electronic processing and/or communication system. One skilled in the art will appreciate that the ports can be configured for numerous type of systems including wireless systems with antennas and hard wired systems that connected to various interfaces like computer networks and other types of communication systems and data transport systems. In some embodiments of a bi-directional interface, the outgoing signal is many orders of magnitude greater that the incoming signal. This can lead to an outgoing-to-incoming signal isolation requirement of greater than 100-150 dB. Achieving such extremely high levels of isolation has proved impractical in prior art bi-directional interfaces.

The sampling theorem, described earlier, indicates it is not necessary to continuously monitor a continuous waveform in order to maintain all the information of the continuous waveform. In fact, one only needs to sample the continuous, bandwidth-limited waveform at two instants in time (i.e. the sampling times) at a sampling rate that is at least twice the bandwidth of the waveform being sampled. The implication for one embodiment of the present teaching is that the intervals between the sampling times, referred to here as the inter-sampling intervals, are available for other purposes that are independent of the sampled signal.

As is known in the sampling art, signal sampling for a continuous signal, such as a received or transmitted signal in a communication system, is implemented using a sampling waveform. FIG. 22 illustrates a sampling waveform 2204 of an embodiment of the current teaching. The sampling waveform turns on for a period of time referred to herein as the sampling time, $\tau$, which is the duration of the sample. The sampling waveform turns off during the inter-sampling intervals. In some embodiments, the sampling time occurs at a regular period, T, that is less than the Nyquist rate related to the bandwidth of the received signal. In some embodiments, the sampling waveform is periodic, with periodicity $\leq T = \frac{1}{2} F_{max}$, so-called Nyquist sampling. In some embodiments, the sampling waveform is not periodic. In some embodiments, the sampling waveform implements sub-sampling, compressive sampling, oversampling, or non-uniform sampling waveforms known in the art.

One embodiment of a bidirectional signal interface of the present teaching samples the incoming continuous signal and then uses the inter-sampling interval for transmission of the outgoing signal. This embodiment requires that the switch connecting the outgoing signal 384 to the bidirectional interface be open during the sampling time, and closed otherwise. In the embodiment shown in FIG. 22, the incoming sampling time switch 382, and the outgoing inter-sampling-interval switch 384 are controlled by the same sampling generator 2202. There is an inverse operation between the sampling generator 2202 and outgoing inter-sampling-interval switch 384. The sampling generator 2202 is connected directly to the incoming sampling time switch 382. In the embodiment shown in FIG. 22, the incoming sampling instant switch 382 is open when the outgoing inter-sampling-interval switch 384 is closed, and the incoming sampling time switch 382 is closed when the outgoing inter-sampling-interval switch 384 is open. In this configuration, the outgoing signal is interrupted to permit sampling of the incoming signal, as described further in connection with FIG. 22.

FIG. 22 illustrates an embodiment, according to the present teaching, for connecting a bi-directional port to both the incoming and outgoing signal ports of an RF system. The interface connects the bi-directional port to the incoming signal port using the switch 382 for the sampling times. In some embodiments, the sampling time $\tau$ may be 1% of the time between samples, T. By sampling at least as often as required by the Nyquist criterion, all the information of the continuous incoming signal is preserved in the samples of the incoming signal, even though the connection between the incoming signal on the bidirectional signal port and the incoming signal port is not continuous. Hence, all the information that would be conveyed by a continuous connection of the bi-directional port to the incoming signal port is preserved, even though in actuality the connection is only made during the sampling times.

In some embodiments of the present teaching, during the inter-sampling intervals, $1-\tau/T$, the outgoing signal port is connected to the bi-directional signal port. In some embodiments, the inter-sampling interval is 99%. In these embodiments, the outgoing signal is always connected to the bi-directional signal port, except for those brief times, $\tau$, when the incoming signal is being sampled. As is well known by those skilled in the art, it is possible to calculate the impact of briefly interrupting the outgoing signal's connection to the bi-directional signal port by expressing the sin (x)/x function in terms of the sampling duty cycle, $\tau/T$:

$$C_n = \frac{\tau}{T} \frac{\sin\left(n\pi\frac{\tau}{T}\right)}{\left(n\pi\frac{\tau}{T}\right)}$$

From this equation, the impact of the sampling time interruptions on the DC or average value of the transmit waveform is derived. $C_0$ is the sampling duty cycle, since for n=0, sin (x)/x=1. Consequently, for a sampling duty cycle of 99%, the DC value of the transmit waveform after sampling time interruptions is 99% of the value before sampling. The configuration of a bi-directional signal interface can achieve high isolation because, as is well known in the art, it is possible to realize RF switches that meet a high-isolation requirement.

Figure 23:
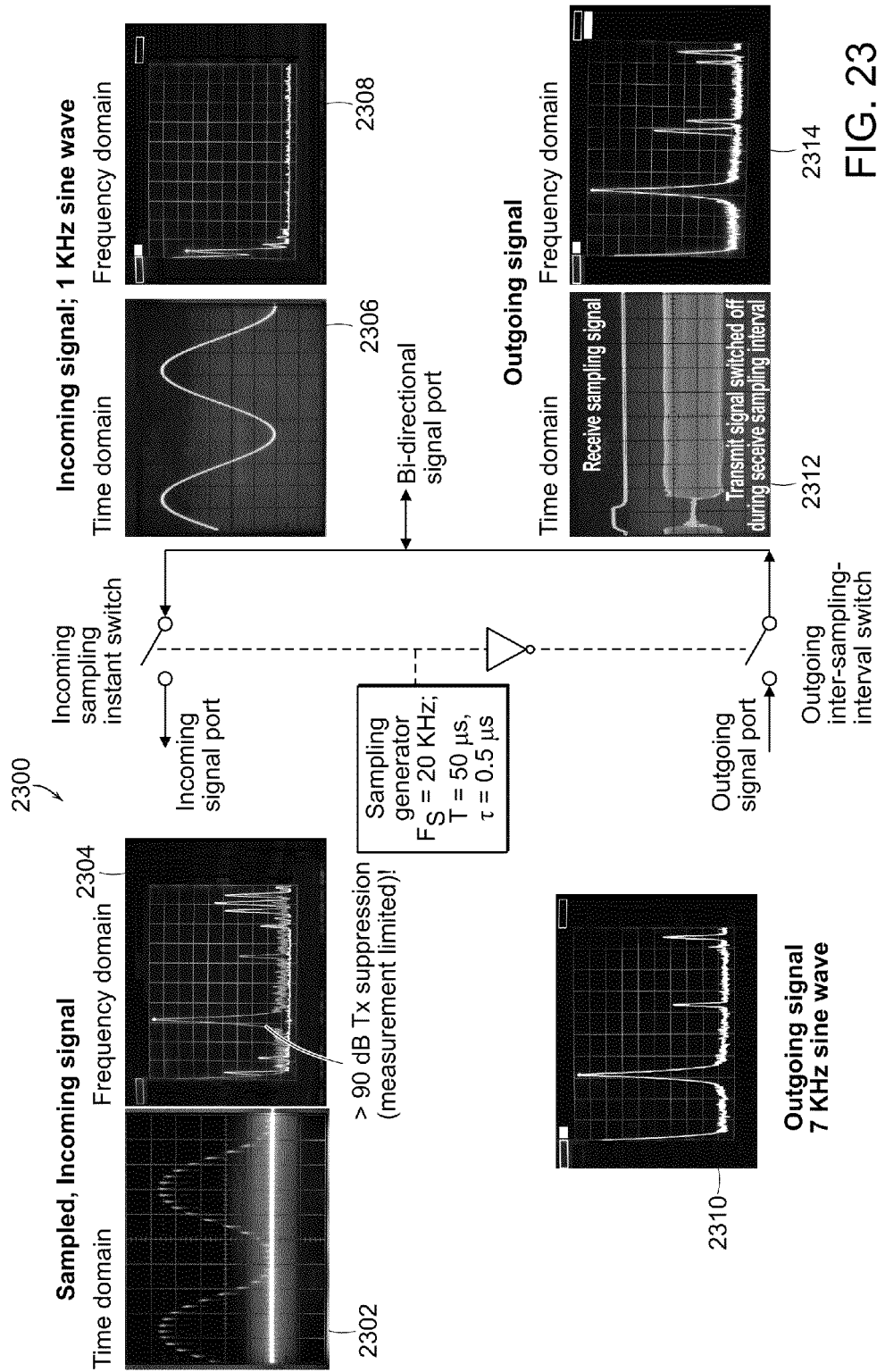
FIG. 23 illustrates measured results of an experimental demonstration of a bi-directional signal interface embodiment of the present teaching.

FIG. 23 illustrates measured results of an experimental demonstration of an embodiment of a bi-directional signal interface of the present teaching. In this embodiment, the controller comprises a sampling generator that produces a sampling waveform. The output of the sampling generator is used to control the incoming sampling time switch. The output of the sampling generator is inverted, and that signal is used to control the outgoing inter-sampling switch. Thus, in this embodiment, the controller synchronizes the two fast switches for simultaneous transmit and receive. The incoming waveform is connected to the receiver by closing the fast switch that connects the incoming signal port to the bidirectional signal port during the sampling times, and the outgoing waveform is disconnected from the bidirectional signal port by opening the fast switch that connects the outgoing signal port to the bidirectional signal port during the sampling times. For the rest of the sampling interval, the incoming waveform is disconnected from the receiver by opening the fast switch that connects the incoming signal port to the bidirectional signal port during the sampling times, and the outgoing waveform is connected to the bidirectional signal port by closing the fast switch that connects the outgoing signal port to the bidirectional signal port during the sampling times. The sampling frequency of the sampling waveform was 20 KHz, which corresponds to T=50 µs. The sampling time was τ=0.5 µs. Function generators were used to supply the outgoing and incoming signals, which were sine waves of 7 KHz and 1 KHz, respectively, as illustrated in FIG. 23. As is well known in the art, function generators do not produce particularly "clean" sine waves, so harmonics of the fundament frequencies are evident in the frequency domain plots of these signals.

The plots across the top of FIG. 23 illustrate the incoming signal before sampling 2306, 2308 and after sampling 2302, 2304, in both the time domain 2302, 2306 and frequency domain 2304, 2308. The plots across the bottom of the figure show the outgoing signal before 2310 and after 2312, 2314 switching the outgoing signal off during the incoming sampling time. The isolation between outgoing and incoming signals is determined by the suppression of the outgoing signal that would appear at the incoming signal port without switching off the outgoing signal relative to the sampled incoming trace. The data presented in FIG. 23 illustrate no evidence of the outgoing signal in the incoming signal, at least to within the measurement capability of the spectrum analyzer. Comparing the incoming signal 2306, 2308 (upper right hand side of FIG. 23) with the sampled version of the incoming signal 2302, 2304 (upper left hand side of FIG. 23) indicates the incoming signal is substantially preserved via the sampling process. The experimental demonstration illustrated in FIG. 23 uses oversampling, which makes it more visually apparent that the sampled version of the incoming signal preserves all the information of the original incoming signal.

Comparing the outgoing signal 2310 (lower left hand side of FIG. 23) with the sampled (or switched) version of the outgoing signal 2312, 2314 (lower right hand side of FIG. 23) shows that the outgoing signal is not substantially changed. This is an advantage of embodiments of the present teaching where the sampling duty cycle is small, on the order of 1%, as in this demonstration.

A key measure of performance for a bidirectional signal interface is the outgoing-to-incoming signal isolation. FIG. 23 shows the frequency domain plot 2304 of the sampled, incoming signal. The signal includes both the incoming signal and the portion of the outgoing signal that appears at the incoming signal port if the outgoing signal was not switched off during the incoming sampling instant. This frequency domain plot 2304 illustrates the coordinated combination of sampling the incoming signal and switching the outgoing signal results in a suppression of the outgoing signal by more than 90 dB, which is the measurement limit of the spectrum analyzer used to make these measurements. In this embodiment, the magnitude of the outgoing signal is suppressed by including a means to switch off the outgoing signal during the interval when the incoming signal is sampled, resulting in a very large suppression of the outgoing signal.

For some applications, fast switches are not yet cost effective, or even available, that can handle the high power of the transmitted signals.

Figure 24:
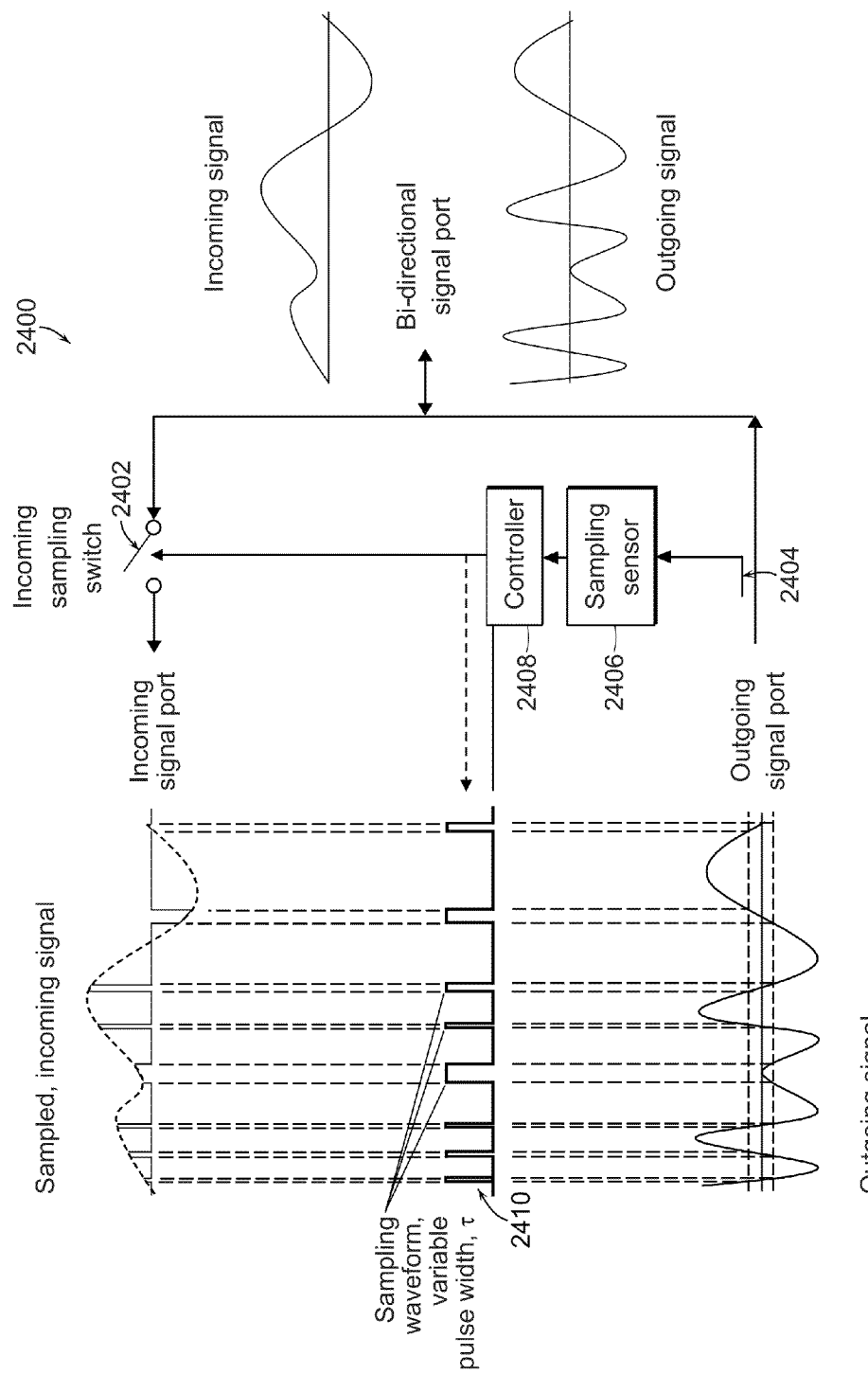
FIG. 24 illustrates an embodiment according to the current teaching without a switch to suppress the outgoing signal during the sampling of the incoming signal.

FIG. 24 illustrates an embodiment of the present teaching that does not require a fast, high-power-handling switch for connecting the transmit signal to the bi-directional port. In this embodiment, the sampling of the incoming signal occurs when the magnitude of outgoing signal is well below the magnitude of the incoming signal.

The embodiment of FIG. 24 relies on a variation of the sampling theorem described earlier that allows for non-uniform sampling. One known sampling method that can be used, for example, is found in the reference: Nonuniform Sampling, Theory and Practice (ed. F. Marvasti), Kluwer Academic/Plenum Publishers, New York, 2000. For this kind of non-uniform sampling to be information-lossless, i.e. for the sampling to be able to perfectly reconstruct the original, continuous waveform, the average sampling rate needs to satisfy the Nyquist criterion, which is that the average sampling rate must be greater than or equal to twice the bandwidth of the signal being sampled.

In some embodiments, a detection circuit is provided to detect when the magnitude of the outgoing signal goes through zero. These zero crossing detections cause samples of the incoming signal to be taken at those times where the magnitude of the outgoing signal passes through zero. Thus, in these embodiments, the incoming signal is sampled when the magnitude of the outgoing signal is low.

In some embodiments, there is no need for electronics, such as fast switches, to force the outgoing signal to zero. In some embodiments, the bandwidth of the outgoing signal is at least as wide as the bandwidth of the incoming signal, and, as such, these embodiments are information-lossless. In other embodiments, compressed sampling can be used, which allows for a sampling rate that is twice the effective bandwidth, but at the expense of a more complex reconstruction.

FIG. 24 illustrates an embodiment of the current teaching in which a portion of the outgoing waveform is sent to a sampling sensor 2406 that senses when the magnitude of the outgoing waveform is sufficiently near the point at which it represents the desired sampling time of the incoming waveform. In some embodiments, the desired sampling time occurs when the magnitude of the outgoing waveform is sufficiently close to zero. One embodiment of the sampling sensor 2406 uses a pair of comparators, connected to form a window detector circuit. A window detector circuit compares an input voltage to two separate reference voltages to determine whether or not the input voltage falls between the two reference voltages. A window detector circuit will typically output a logical 1, or a high-value output voltage for the time period when the input voltage value is between the two reference voltage values. A window detector circuit will typically output a logical 0, or a low-value output voltage when the input voltage value falls outside of the voltage range defined by the two reference voltages. The embodiment illustrated in FIG. 24 uses the output pulses from the sampling sensor directly to sample the incoming waveform. The sampling sensor 2406 is connected to a controller 2408 that generates a sampling waveform 2410 used to control the sampling switch 2402.

The embodiment illustrated in FIG. 24 exhibits variable width sampling pulses because the sampling pulse width depends on the slope of the outgoing waveform near the selected sampling time. As is known from the sampling art, wide sampling pulses will effectively low-pass filter the sampling, which can lead to distortion of the sampled waveform. The embodiment illustrated in FIG. 25 overcomes this limitation.

Figure 25:
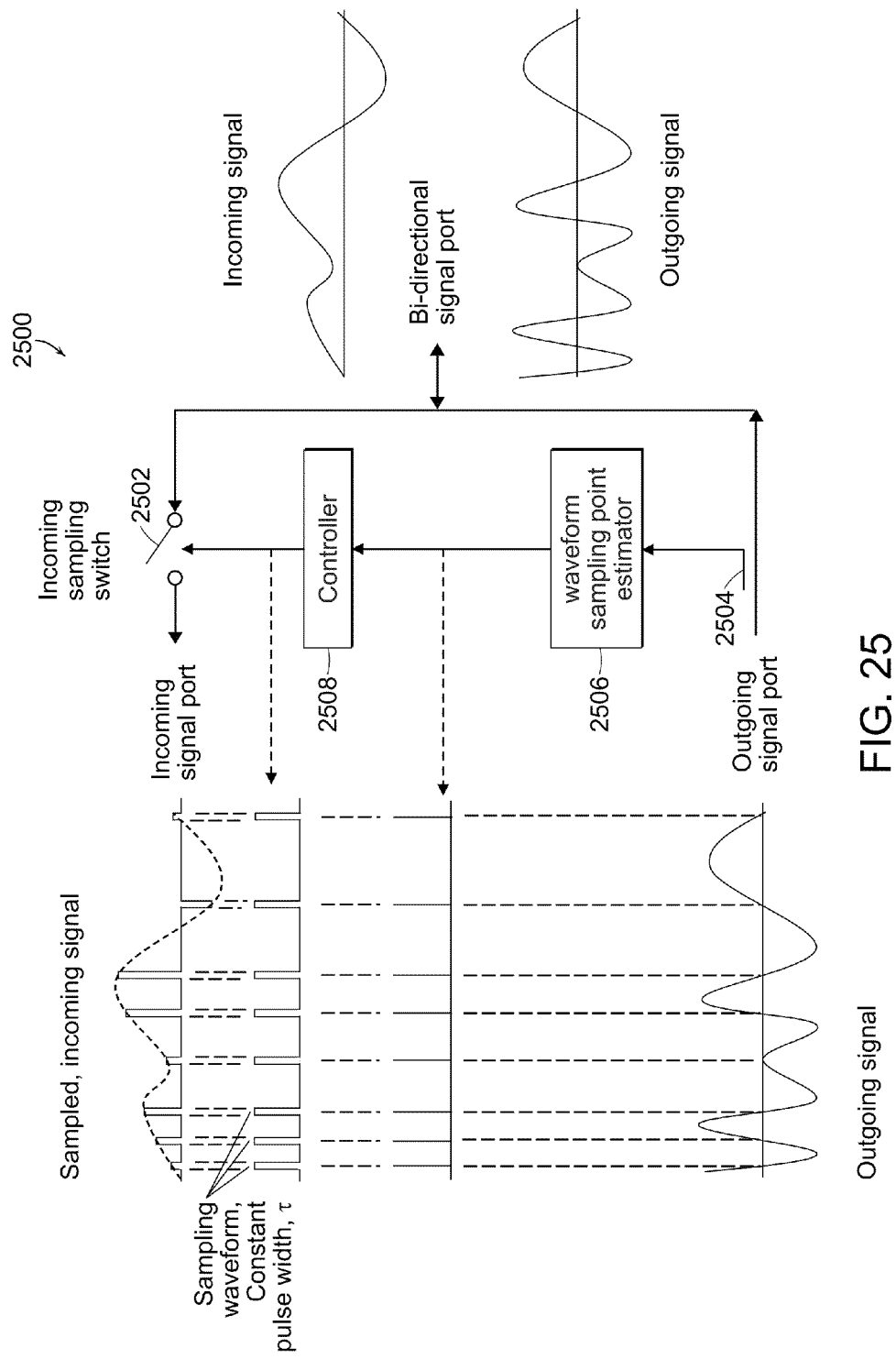
FIG. 25 illustrates a second embodiment of the current teaching without a switch to suppress the outgoing signal during the sampling of the incoming signal.

FIG. 25 illustrates an embodiment that includes a waveform sampling point estimator 2506 for estimating when the transmit waveform passes through the desired sampling time that supports generating sampling pulses of uniform width. The waveform sampling point estimator 2506 is connected to a controller 2508 that synchronizes the switch operation for simultaneous transmit and receive by generating a signal that opens and closes the switch 2502 at the appropriate times, which in some embodiments are the zero crossings of the outgoing signal.

One embodiment of the waveform sampling point estimator uses the derivative or some other property of the outgoing waveform, such as frequency, amplitude, or shape of the waveform, in the vicinity of the desired sampling point. In the embodiment shown in FIG. 25, this sampling point would occur when the magnitude of the outgoing waveform is near zero. The waveform sampling point estimator 2506 is fed to a controller 2508 that generates sampling pulses that are approximately equal in width.

Some embodiments of the present teaching relying on a sampling pulse generator could exhibit a delay in generating the sampling pulses owing to the sampling pulse generator processing delay. An embodiment that overcomes this delay sets the waveform sampling point estimator 2506 to estimate points on the outgoing waveform that precede the desired sampling times by the amount of the known sampling pulse generator delay.

Figure 26:
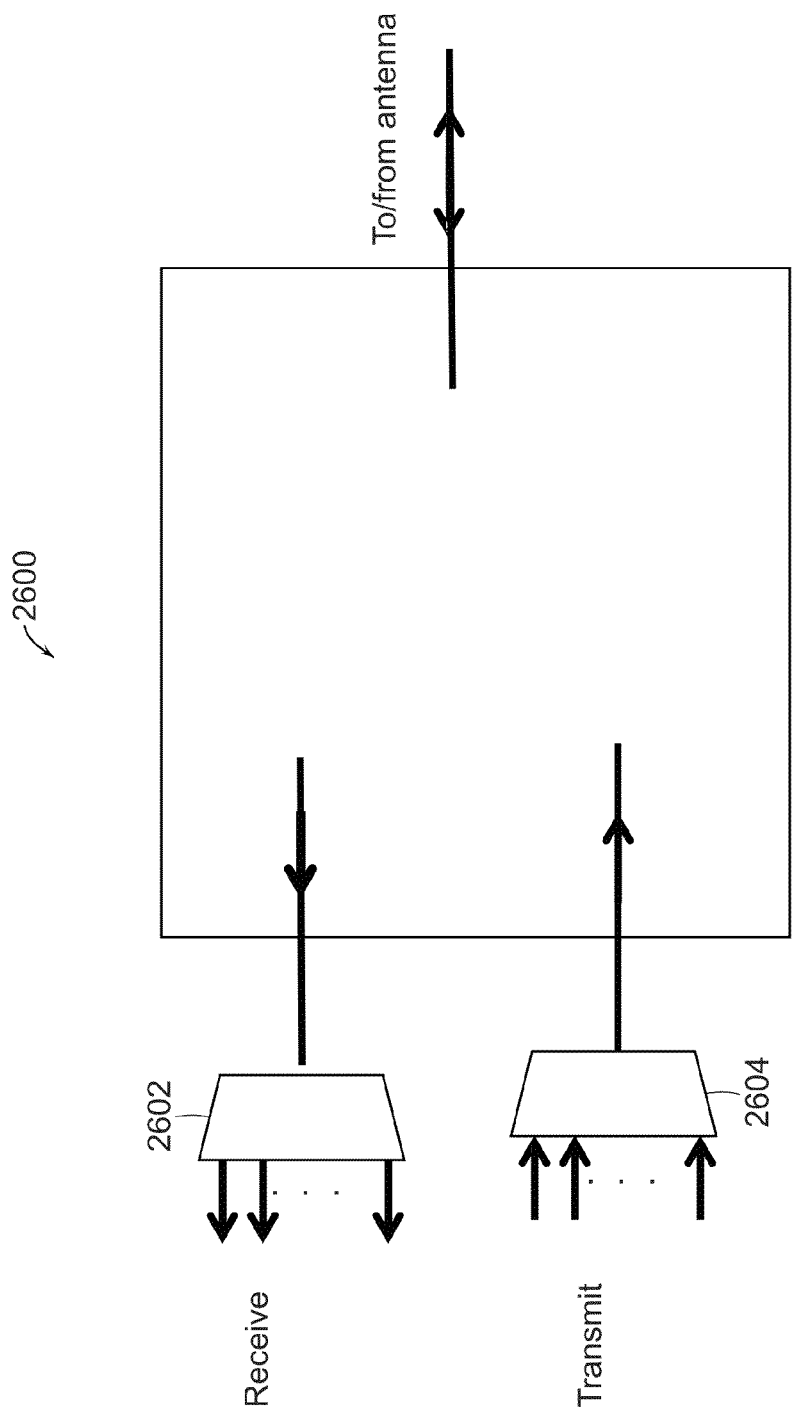
FIG. 26 illustrates an embodiment according to the current teaching with a multiplexer and demultiplexer.

FIG. 26 illustrates an embodiment of the present teaching that includes either a demultiplexer 2602 attached to the incoming signal port, or a multiplexer 2604 attached to the outgoing signal port, or both, as shown in FIG. 26. Any known multiplexing technique may be used in various embodiments, including time-division multiplexing, frequency division multiplexing, code-division multiplexing, or polarization multiplexing. In some embodiments, incoming signals that include multiple, independent, multiplexed signals are received by the antenna. The incoming multiplexed signal in these embodiments is passed through the signal connector to a receive-out port, or a differencing device, or a signal processor, or a sampler. The signals are subsequently demultiplexed at the demultiplexer 2602, and then, each demultiplexed signal is received and/or processed separately. In some embodiments, a multiplexing device is used on the outgoing signal port, transmit port, or transmit path. In these embodiments, multiple outgoing transmit signals are multiplexed at the multiplexer 2604, which is connected to the transmit path, the transmit-in port, or the outgoing signal port. The multiplexed signal is then passed to the output antenna via the signal connector.

EQUIVALENTS

While the Applicant's teaching is described in conjunction with various embodiments, it is not intended that the Applicant's teaching be limited to such embodiments. On the contrary, the Applicant's teaching encompass various alternatives, modifications, and equivalents, as will be appreciated by those of skill in the art, which may be made therein without departing from the spirit and scope of the teaching.

What is claimed is:

1. A simultaneous transmit and receive (STAR) system comprising:
   a. a first bidirectional signal port electrically coupled to an antenna, a second port electrically coupled to a transmit signal path, and a third port electrically coupled to receive signal path;
   b. a first switch electrically connected between the first bidirectional signal port and the second port electrically coupled to a transmit signal path, wherein a transmit signal propagating in the transmit signal path passes through the first switch when closed and then through the first bidirectional signal port to the antenna where the transmit signal is radiated by the antenna;
   c. a second switch electrically connected between the first bidirectional signal port and the third port electrically coupled to a receive signal path, wherein a receive signal is received by the antenna and passes through the bidirectional signal port and then through the second switch when closed to the receive signal path; and
   d. a controller that is electrically connected to a control input of each of the first and second switches, the controller synchronizing operation of the first and second switches for simultaneous transmit and receive, wherein the controller generates a first sampling waveform with a first sampling time that opens the first switch and an inverse first sampling waveform with a first inverse sampling time that closes the second switch to pass the received signal to the receive signal path, and generates a second sampling waveform with a second sampling time that simultaneously closes the first switch and an inverse second sampling waveform with a second inverse sampling time that opens the second switch for a second predetermined time to pass the transmit signal to the antenna.

2. The STAR system of claim 1 wherein the simultaneous transmit and receive system comprises a same-aperture any-frequency simultaneously transmit and receive system.

3. The STAR system of claim 1 wherein at least one of the first and second switches comprise fast switches having a switching time that is less than or equal to ten percent of the lesser of the first and second sample times and the first and second inverse sampling times.

4. The STAR system of claim 1 wherein at least one of the first and second sampling times and the first and second inverse sampling times is a predetermined sampling time.

5. The STAR system of claim 1 wherein at least one of the first and the second sampling waveform and the first and second inverse sampling waveforms is determined in response to an analysis of the received signal.

6. The STAR system of claim 1 wherein at least one of the first and the second sampling waveform and the first and second inverse sampling waveforms is determined in response to an analysis of the transmit signal.

7. The STAR system of claim 1 wherein at least one of the first and second sampling waveforms and the first and second inverse sampling waveforms comprises a sampling frequency that is equal to the Nyquist sampling frequency.

8. The STAR system of claim 1 wherein at least one of the first and second sampling waveforms and the first and second inverse sampling waveforms comprises a compressive sampling waveform.

9. The STAR system of claim 1 wherein at least one of the first and second sampling waveforms and the first and second inverse sampling waveforms comprises a non-uniform sampling waveform.

10. The STAR system of claim 1 wherein at least one of the first and second sampling waveforms and the first and second inverse sampling waveforms comprises an oversampling waveform.

11. The STAR system of claim 1 wherein at least one of the inverse first and second waveforms is displaced in time relative to at least one of the first and second sampling waveforms.

12. The STAR system of claim 1 wherein the first sampling time and the first inverse sampling time are substantially equal.

13. The STAR system of claim 1 wherein the second sampling time and the second inverse sampling time are substantially equal.

14. The STAR system of claim 1 wherein at least two of the first sampling time, second sampling time, first inverse sampling time, and the second inverse sampling time are substantially equal.

15. The STAR system of claim 1 wherein the first sampling time is substantially equal to the second sampling time.

16. The STAR system of claim 1 wherein the first inverse sampling time is substantially equal to the second inverse sampling time.

17. A simultaneous transmit and receive (STAR) system comprising:
   a. a first bidirectional signal port electrically coupled to an antenna, a second port electrically coupled to a transmit signal path, and a third port electrically coupled to receive signal path;
   b. a transmission signal sampling sensor that senses an amplitude of a transmission signal propagating in the transmission signal path;
   c. a switch electrically connected between the first bidirectional signal port and the third port electrically coupled to receive signal path; and
   d. a controller that is electrically connected to a control input of the switch, the controller synchronizing operation of the switch for simultaneous transmit and receive by generating a signal that closes the switch when the transmission signal sampling sensor indicates that the amplitude of the transmission signal propagating in the transmission signal path reaches a predetermined amplitude.

18. The STAR system of claim 17 wherein the predetermined amplitude is substantially zero volts.

19. The STAR system of claim 17 wherein the predetermined amplitude is an offset from zero volts.

20. The STAR system of claim 17 wherein the simultaneous transmit and receive system comprises a same-aperture any-frequency simultaneously transmit and receive system.

21. The STAR system of claim 17 wherein the sampling sensor comprises a pair of comparators configured as a window detector.

22. The STAR system of claim 17 further comprising a waveform sampling point estimator electrically connected to the controller, the waveform sampling point estimator predicting when the sampling sensor will indicate that the amplitude of the transmission signal propagating in the transmission signal path will reach the predetermined amplitude and instructing the controller based on the prediction.

23. The STAR system of claim 22 wherein the switch comprises a fast switch.

24. A simultaneous transmit and receive (STAR) system comprising:
   a. a first bidirectional signal port electrically coupled to an antenna, a second port electrically coupled to a transmit signal path, and a third port electrically coupled to receive signal path;
   b. a waveform sampling point estimator that senses a property of a transmission signal in the transmission signal path;
   c. a switch electrically connected between the first bidirectional signal port and the third port electrically coupled to receive signal path; and
   d. a controller that is electrically connected to a control input of the switch, the controller synchronizing operation of the switch for simultaneous transmit and receive by generating a signal that closes the switch when the waveform sampling point estimator indicates that the transmission signal propagating in the transmission signal path has a desired property of the transmission signal in the transmission signal path.

25. The STAR system of claim 24 wherein the predetermined signal characteristics comprises amplitude.

26. The STAR system of claim 24 wherein the predetermined signal characteristics comprises frequency of the transmission signal.

27. The STAR system of claim 24 wherein the predetermined signal characteristics comprises signal distortion of the transmission signal.

28. The STAR system of claim 24 wherein the predetermined signal characteristics comprises a derivative of an amplitude of the transmission signal.

29. The STAR system of claim 24 wherein the switch comprises a fast switch.

* * * * *